United States Patent
Sicilia et al.

(10) Patent No.: US 11,080,641 B1
(45) Date of Patent: *Aug. 3, 2021

(54) GRAPHICAL USER INTERFACE FOR ENABLING ASSOCIATION OF TIMESTAMPED MACHINE-GENERATED DATA AND HUMAN-GENERATED DATA

(71) Applicant: Splunk Inc., San Francisco, CA (US)

(72) Inventors: Peter Sicilia, Mill Valley, CA (US); Archana Sulochana Ganapathi, Palo Alto, CA (US); Frederick Dean de Boer, San Ramon, CA (US); Matthew Green, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,206

(22) Filed: Mar. 6, 2020

Related U.S. Application Data

(63) Continuation of application No. 15/224,598, filed on Jul. 31, 2016, now Pat. No. 10,628,771.

(51) Int. Cl.
*G06Q 10/06* (2012.01)
(52) U.S. Cl.
CPC .............................. *G06Q 10/06393* (2013.01)
(58) Field of Classification Search
CPC ... G06Q 10/00; G06Q 40/00; G06Q 10/06393
USPC ....................................................... 705/7.39
See application file for complete search history.

(56) References Cited

U.S. PATENT DOCUMENTS

| | | |
|---|---|---|
| 6,366,299 B1 | 4/2002 | Lanning et al. |
| 6,574,605 B1 | 6/2003 | Sanders et al. |
| 7,305,392 B1 | 12/2007 | Abrams et al. |
| 7,822,662 B2 | 10/2010 | Guzik et al. |

(Continued)

FOREIGN PATENT DOCUMENTS

WO    WO-2009008783 A1 *   1/2009   ............. H04L 65/80

OTHER PUBLICATIONS

M. Ishaq et al (The key performance indicators (KPI) and their impact on overall organizational performance), Dec. 2013, Springer Science+Business Media Dordrect, pp. 1-18 (Year: 2013).*

(Continued)

*Primary Examiner* — Romain Jeanty
(74) *Attorney, Agent, or Firm* — Perkins Coie LLP

(57) ABSTRACT

Disclosed is a system and method for cross-silo acquisition, reporting and analysis of enterprise data. A computer system receives enterprise data related to various vertical units of an enterprise, including machine-generated data and human-generated data. The computer system stores the machine-generated data with associations to at least some of the human generated data, and associates persona data representing a plurality of personas with the plurality of vertical units of the enterprise, such that at least one persona is associated with each of the vertical units. The computer system further associates a plurality of user-defined key performance indicators (KPIs) with the personas, and associates each of a plurality of users with at least one of the personas. The computer system computes the KPIs based on the enterprise data, and controls access by the users to the computed KPIs, based on personas to which the users are assigned.

21 Claims, 20 Drawing Sheets

(56) References Cited

U.S. PATENT DOCUMENTS

| | | | |
|---|---|---|---|
| 8,219,440 | B2 | 7/2012 | Bhandari et al. |
| 8,290,806 | B2 | 10/2012 | Lee et al. |
| 8,311,863 | B1 | 11/2012 | Kemp |
| 8,428,997 | B2 | 4/2013 | Maga et al. |
| 8,615,533 | B2 | 12/2013 | Johnson et al. |
| 8,683,370 | B2 | 3/2014 | Marchand et al. |
| 8,782,616 | B2 | 7/2014 | Wright |
| 9,128,995 | B1 | 9/2015 | Fletcher et al. |
| 9,298,914 | B1 | 3/2016 | McCorkendale |
| 2002/0042751 | A1 | 4/2002 | Sarno |
| 2002/0147644 | A1 | 10/2002 | Subramanian et al. |
| 2004/0128204 | A1* | 7/2004 | Cihla ............... G06Q 30/0641 705/7.36 |
| 2009/0157447 | A1 | 6/2009 | Busch |
| 2009/0192867 | A1 | 7/2009 | Farooq et al. |
| 2009/0199124 | A1 | 8/2009 | Birch |
| 2010/0122119 | A1 | 5/2010 | Bildhauer et al. |
| 2010/0268768 | A1 | 10/2010 | Kurtenbach et al. |
| 2010/0299279 | A1 | 11/2010 | Davidson et al. |
| 2011/0125741 | A1* | 5/2011 | Brobst ................ G06F 16/00 707/736 |
| 2011/0137714 | A1 | 6/2011 | Bhandari et al. |
| 2011/0161917 | A1* | 6/2011 | Thomson ............. G06F 16/84 717/105 |
| 2014/0006347 | A1 | 1/2014 | Qureshi et al. |
| 2014/0129457 | A1 | 5/2014 | Peeler |
| 2014/0157142 | A1 | 6/2014 | Heinrich et al. |
| 2014/0358745 | A1 | 12/2014 | Lunan |
| 2015/0100604 | A1 | 4/2015 | Ciancio-Bunch et al. |
| 2016/0027019 | A1 | 1/2016 | Michaelangelo et al. |
| 2016/0105330 | A1* | 4/2016 | Choudhary ........... G06F 3/0484 715/736 |
| 2016/0105338 | A1 | 4/2016 | Fletcher et al. |
| 2016/0132575 | A1* | 5/2016 | Fletcher ............... G06F 9/542 707/722 |
| 2016/0147380 | A1 | 5/2016 | Coates et al. |
| 2016/0216855 | A1 | 7/2016 | Choudhary et al. |
| 2016/0226720 | A1* | 8/2016 | Alexseyev ........... G06F 16/903 |
| 2016/0292611 | A1* | 10/2016 | Boe ................ G06Q 10/06393 |
| 2016/0314605 | A1 | 10/2016 | Filippi et al. |
| 2017/0116552 | A1 | 4/2017 | Deodhar et al. |

OTHER PUBLICATIONS

Advisory Action dated Mar. 26, 2019 for U.S. Appl. No. 15/224,598 of Sicilia et al., filed Jul. 31, 2016.
Final Office Action dated Jan. 25, 2019 for U.S. Appl. No. 15/224,598 of Sicilia et al., filed Jul. 31, 2016.
Final Office Action dated Jan. 31, 2020 for U.S. Appl. No. 15/224,590 of de Boer et al., filed Jul. 31, 2016.
Final Office Action dated Oct. 31, 2019 for U.S. Appl. No. 15/224,596 of de Boer et al., filed Jul. 31, 2016.
Non-Final Office Action dated Aug. 7, 2019 for U.S. Appl. No. 15/224,598 of Sicilia et al., filed Jul. 31, 2016.
Non-Final Office Action dated Dec. 5, 2019 for U.S. Appl. No. 15/224,590 of de Boer et al., filed Jul. 31, 2016.
Non-Final Office Action dated Jul. 6, 2018 for U.S. Appl. No. 15/224,598 of Sicilia et al. filed Jul. 31, 2016.
Non-Final Office Action dated Jun. 26, 2019 for U.S. Appl. No. 15/224,596 of de Boer et al., filed Jul. 31, 2016.
Notice of Allowance dated Dec. 11, 2019 for U.S. Appl. No. 15/224,598 of Sicilia et al., filed Jul. 31, 2016.
Notice of Allowance dated Feb. 13, 2020 for U.S. Appl. No. 15/224,598 of Sicilia et al., filed Jul. 31, 2016.
Parker, John , "KPIs for Business Analysis and Project Management", Enfocus Solutions Inc., retrieved online on Feb. 9, 2020 from url: https://enfocussolutions.com/kpis-for-business-analysis-and-project-management, Mar. 22, 2020, 5 pages.
Kosut, Mackenzie , et al., "Planning Successful Analytics Projects", Your Data Adventure conference 2014, 2014, 33 pages.
Johnvey , "Can I inject events into Splunk via a script?", retrieved online from url: https://answers.splunk.com/answers/33/can-i-inject-events-into-splunk-via-a-script.html, Jan. 13, 2010, 7 pages.
"Performance Driven Management—What Gets Measured Gets Done", The Lean Accountants; retrieved online from url: https://www.leanaccountants.com/2011/02/performance-driven-management-what-gets-measured-gets-done.html, 3 pages.
Acharlieh , "Can Splunk be adapted for use with human-keyed data rather than machine data?", retrieved online from url: https://answers.splunk.com/answers/189213/can-splunk-be-adapted-for-use-with-human-keyed-dat.html, Nov. 20, 2014, 4 pages.
Bobm , "Merge events based on common field", retrieved online from url: https://answers.splunk.com/answers/108154/merge-events-base-on-common-field.html, Oct. 27, 2013, 5 pages.
Carasso, David , "Exploring Splunk—Search Processing Lanaguage (SPL) Primer and Cookbook", Apr. 2012, 156 Pages.
Doshi, Nimish , "Indexing Feeds", retrieved online from url: https://www.splunk.com/en_us/blog/tips-and-tricks/indexing-fees.html, Mar. 14, 2012, 6 pages.
Ganapathi, Archana , et al., "Advanced Use Cases for Analytics", Your Data Adventure conference 2014, 2014, 26 pages.

* cited by examiner

GRAPHICAL USER INTERFACE FOR ENABLING ASSOCIATION OF TIMESTAMPED MACHINE-GENERATED DATA AND HUMAN-GENERATED DATA

CROSS-REFERENCE TO RELATED APPLICATION

This application is a continuation of U.S. patent application Ser. No. 15/224,598, filed on Jul. 31, 2016, entitled "Graphical User Interface for Visualizing Key Performance Indicators", which is incorporated by reference herein in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

At least one embodiment of the present disclosure pertains to information organization and understanding, and more particularly, to a tool for the organization and understanding of enterprise data pertaining to multiple "silos" within an enterprise.

BACKGROUND

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data ("machine data"). In general, machine data can include performance data, diagnostic information and/or any of various other types of data indicative of performance or operation of equipment in a computing system. Such data can be analyzed to diagnose equipment performance problems, monitor user interactions, and to derive other insights. This is in contrast with human-generated data, i.e., data created by a human being.

A number of tools are available today to analyze machine-generated data. In order to reduce the volume of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may, for example, enable an analyst to investigate different aspects of the machine data that previously were unavailable for analysis. However, analyzing and searching massive quantities of machine data presents a number of challenges.

Various tools are also available today to analyze human-generated data. For example, customer relations management (CRM) software applications are available for gathering and reporting sales data for a business enterprise. However, such tools are focused on a single business unit within an enterprise, such as the sales group, limiting their usefulness. Further, existing data analyses and reporting tools do not provide the ability to gather, report and/or facilitate analysis of both human-generated data and machine data.

BRIEF DESCRIPTION OF THE DRAWINGS

One or more embodiments of the present disclosure are illustrated by way of example and not limitation in the figures of the accompanying drawings, in which like references indicate similar elements.

FIG. 14 illustrates another display screen by which a user can view the underlying data.

FIG. 15 illustrates an example of a search screen from which a user can initiate a search query and view search results.

DETAILED DESCRIPTION

Figure 1:
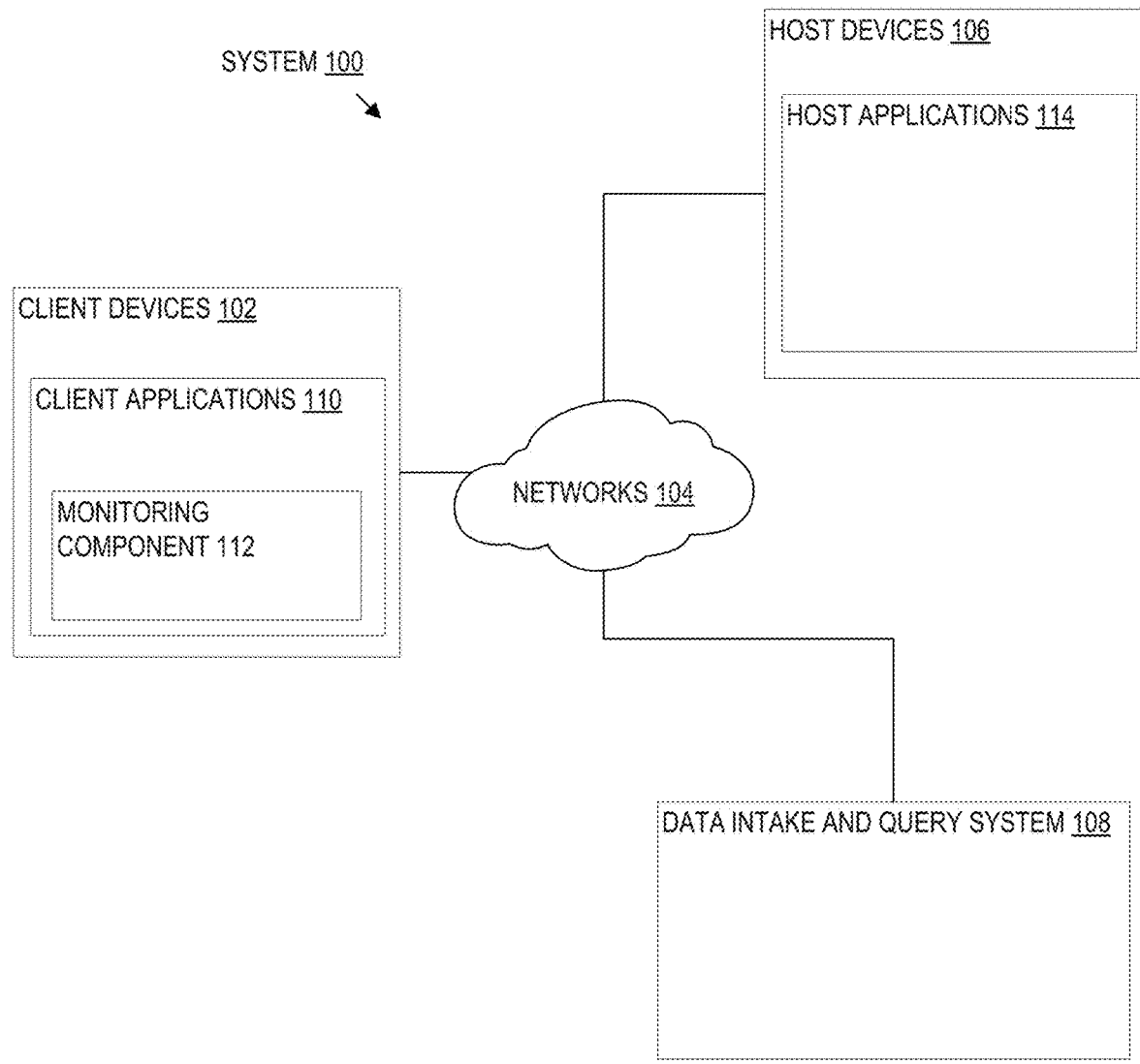
FIG. 1 illustrates a networked computer environment in which an embodiment may be implemented.

A company or other business enterprise may include multiple business units, groups or departments, such as a sales group, a marketing group, an information technology (IT) group, a research and development (R&D) group, etc. Such business units, groups or departments are also referred to interchangeably herein as "vertical units," "verticals" or "silos" of an enterprise. Existing enterprise data acquisition and reporting tools do not provide the ability to gather, report or analyze data across multiple silos of an enterprise. For example, existing CRM tools are focused on gathering and reporting data related to only the sales unit of an enterprise. The techniques introduced here, therefore, address (among other things) the lack of availability to business executives of cross-silo information to support their decision-making processes.

In particular, the techniques introduced here include a cross-silo enterprise data acquisition, reporting and analysis system (the "system"). In various embodiments the system automatically gathers machine data (e.g., server log events) and human-generated data (also called "human data") (e.g., sales leads and customer data) from multiple data sources across different silos within an enterprise (e.g., sales, marketing, engineering, human resources). The human-generated data can include data input to the system directly by end users of the system and/or human-generated data acquired from third-party provided software applications. The system consolidates data related to the various silos and provides apps and dashboards for specific business sub-units. Users of the system can range from executive staff of an enterprise to individual contributors, and the system provides persona-specific views into relevant data and dashboard ("personas" are described below).

The system generates a graphical user interface (GUI) that includes various data entry screens for use by end users to input and store human-generated enterprise data in the system, where the human-generated data can be stored as timestamped event data and associated with related time-stamped machine data acquired by the system. The system can retrieve, in response to a single search query, human-generated data along with associated machine-generated data. In certain embodiments, a single software application is used to store machine data and human-generated data in association with each other.

The system computes, for each silo, various key performance indicators (KPIs) from the acquired data (human-generated and/or machine generated data) and allows graphical configuration and visualization of those KPIs by end users. A KPI is a metric or parameter indicative of an aspect of performance of an entity, such as a silo or a portion of a silo within an enterprise. The system provides a hybrid role-based access control (RBAC) paradigm in which an administrative user of the system ("administrator") can create various "personas" (meta-roles) for the end users, for controlling the end users' access to data, in addition to conventional roles for controlling access to data. The personas can be logically organized into a matrix whose columns represent the silos (departments, groups, etc.) within the enterprise and whose rows represent hierarchical persona levels. The system automatically computes and outputs the KPIs associated with each persona, including computing weighted, user-specified sub-KPIs for each KPI, and allows roll-up of KPIs within the persona hierarchy in a given silo.

In certain embodiments the GUI of the system enables a user to specify which KPIs are to be computed for (and accessible to) each persona, including specifying the sub-KPIs to be used in computing any given KPI and how those sub-KPIs are to be weighted. The GUI further allows a user to visualize graphically a vertical roll-up of any KPI within his/her silo up to and including the level of his/her persona, and in some cases a horizontal cross-silo roll-up of certain KPIs within his/her persona level. In general, each persona has access to all KPIs to which any persona lower than it in the hierarchy (i.e., with less authority), if any, has access. However, a given persona will also normally have access to additional KPIs to which lower-level personas in the hierarchy do not have access.

The system can include one or more software-defined "connectors," each of which corresponds to a different external third-party provided software application that acts a source of data to the system. Data from such third-party software applications can be received as live data feeds and/or as snapshots of data at various points in time.

In certain embodiments the system allows an administrator to define personas, to assign end users to those personas, to define data entry screens for enabling end users to input various types of human-generated data for storage as event data in association with machine data, and to assign those data entry screens to particular personas.

Before further describing the system for cross-silo enterprise data acquisition, reporting and analysis, it is useful to consider an event-based data intake and query system, as will now be described.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

Analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources.

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, computer system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. CLIENT DEVICES

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference herein in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
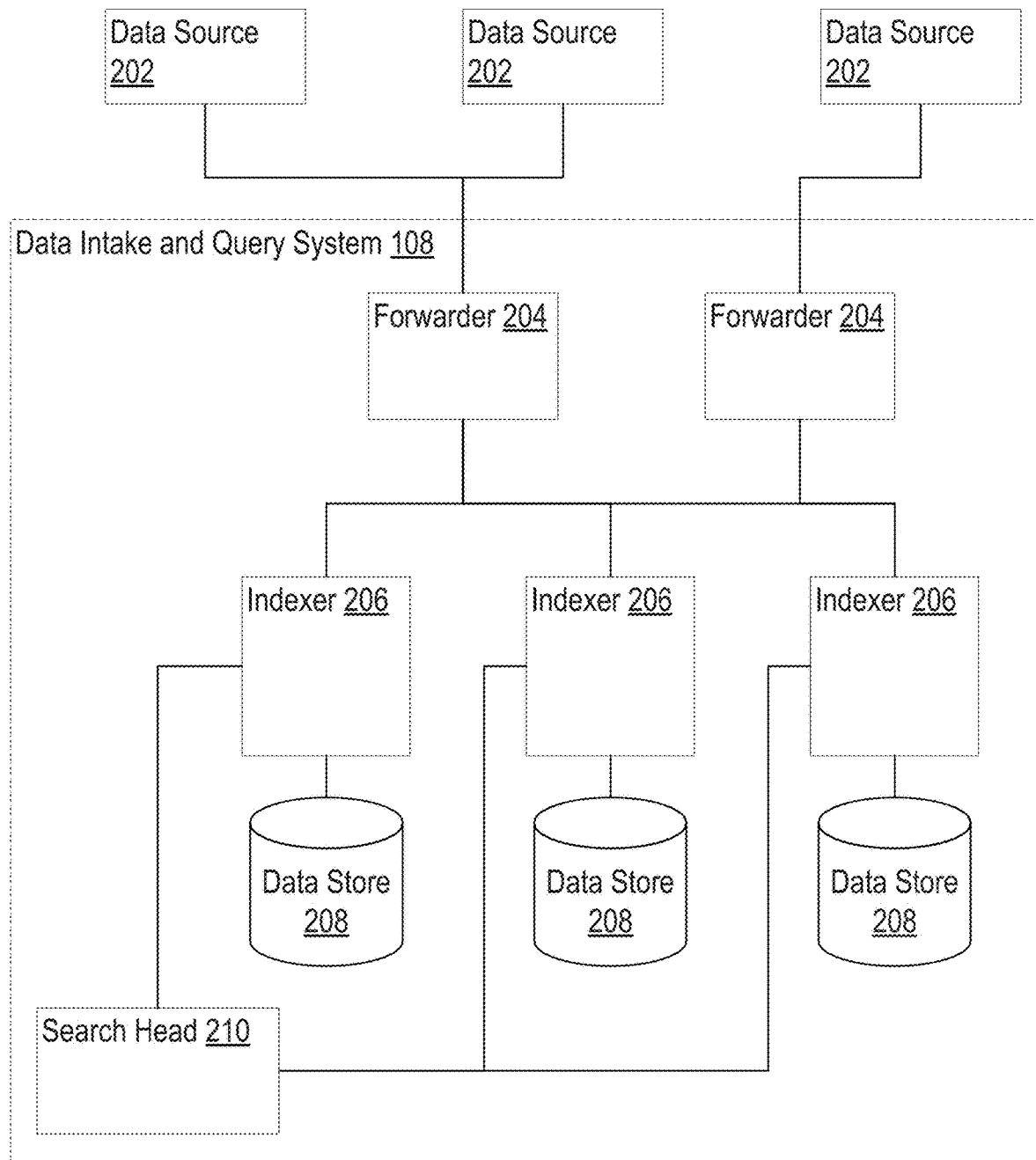
FIG. 2 illustrates a block diagram of an example data intake and query system in which an embodiment may be implemented.

FIG. 2 depicts a block diagram of an illustrative data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
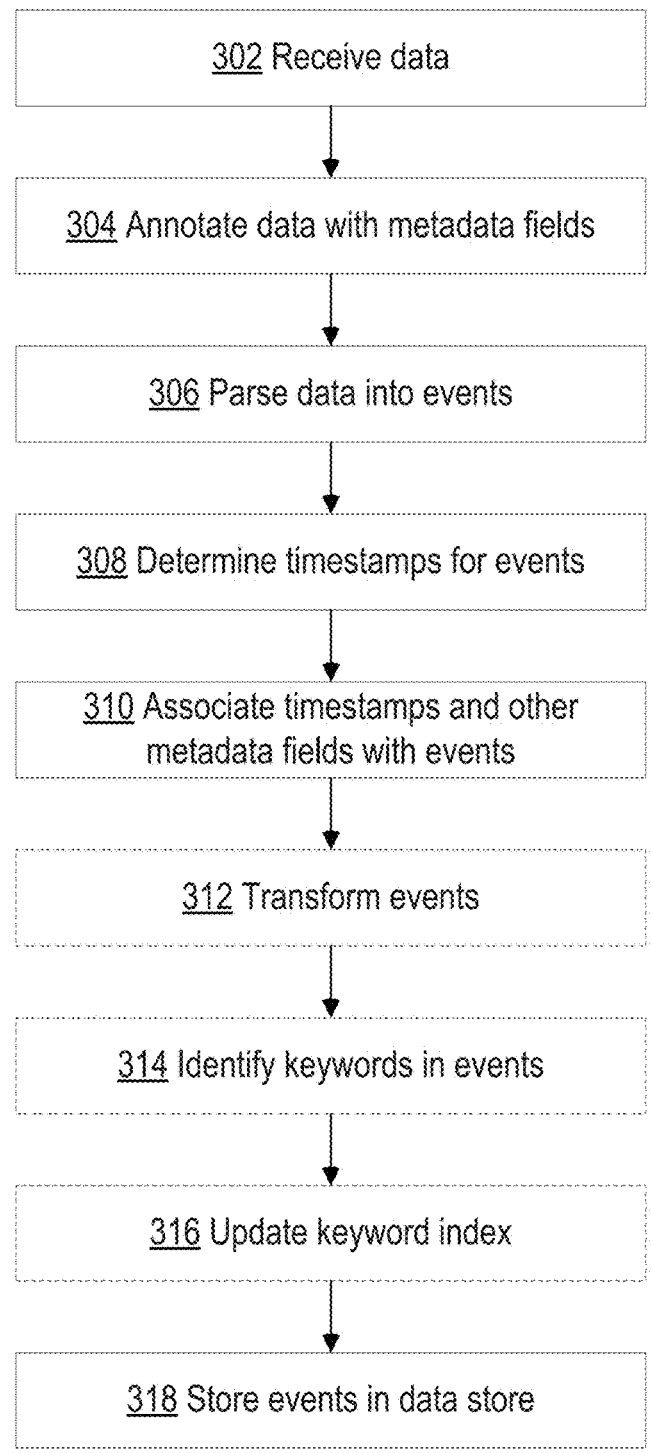
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. Pat. No. 9,130,971, entitled "SITE-BASED SEARCH AFFINITY", filed on 30 Apr. 2014, and in U.S. Pat. No. 9,124,612, entitled "MULTI-SITE CLUSTERING", also filed on 30 Apr. 2014, each of which is hereby incorporated by reference in its entirety for all purposes.

2.6. Query Processing

Figure 4:
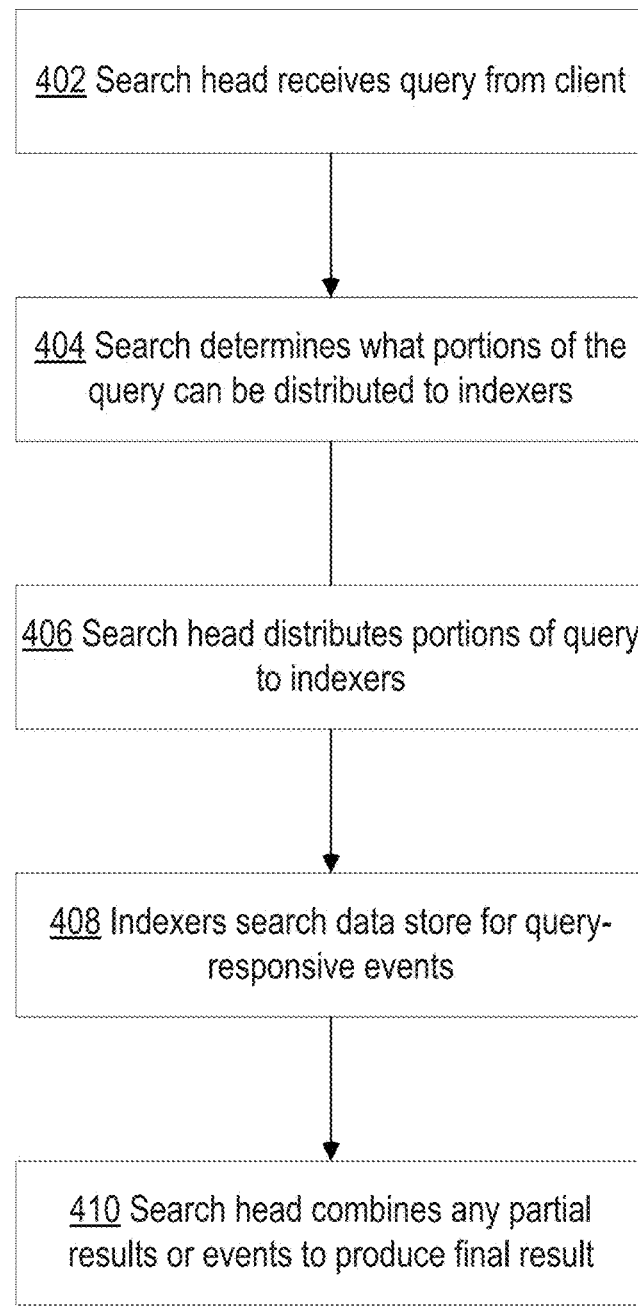
FIG. 4 is a flow diagram that illustrates how a search head and indexers perform a search query.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

2.8 Cross-Silo Enterprise Data Acquisition, Reporting and Analysis

Figure 5:
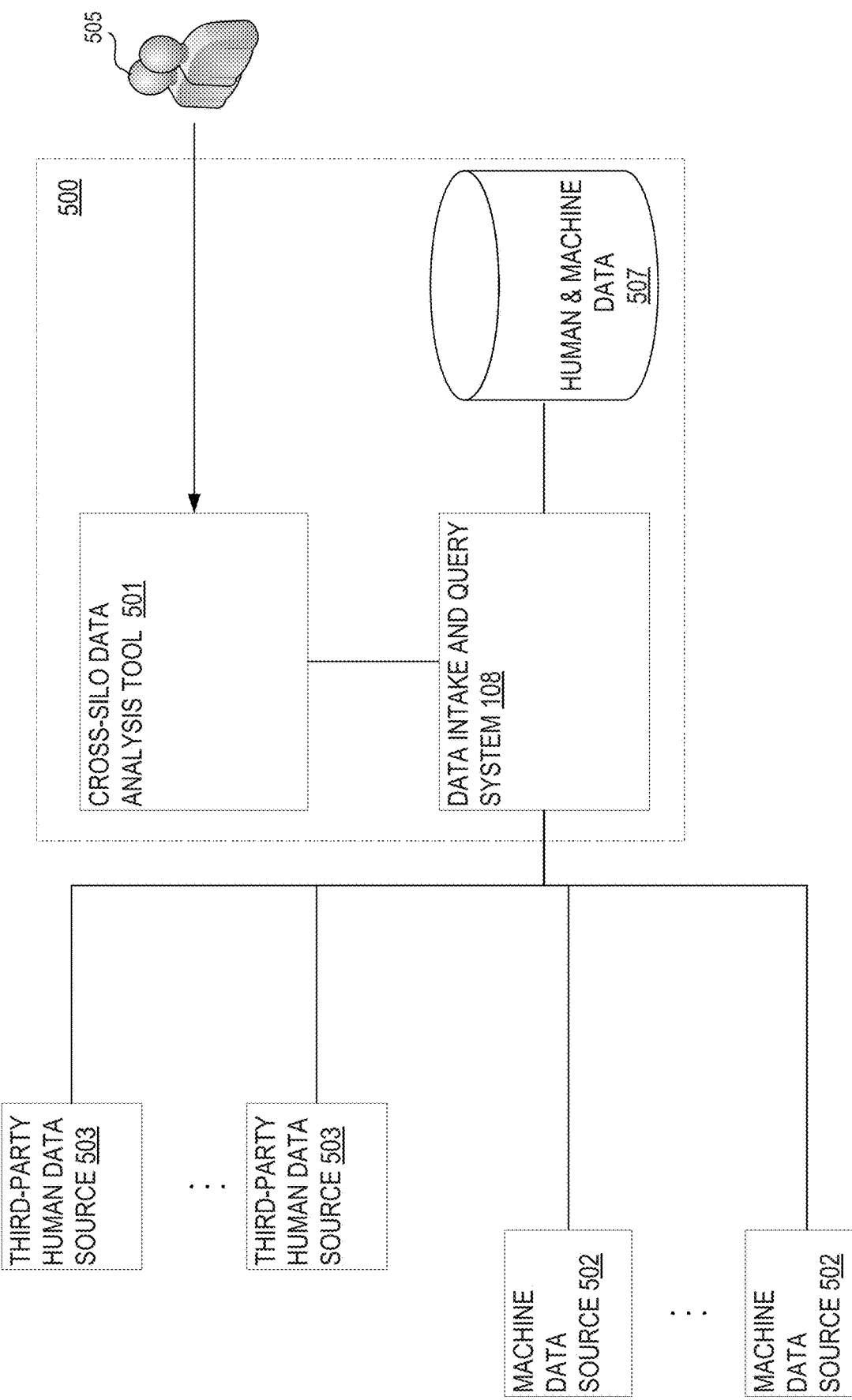
FIG. 5 illustrates a cross-silo enterprise data gathering, reporting and analysis system.

Data intake and query system 108 in certain embodiments can include, be part of, or be used in conjunction with a cross-silo enterprise data acquisition, reporting and analysis system, cross-silo enterprise data intake and query system as briefly described above. FIG. 5 illustrates an embodiment of a cross-silo enterprise data acquisition, reporting and analysis system ("the system") 500 used in conjunction with the data intake and query system 108. The system 500 represents a variation of system 100 in FIG. 1. The system 500 includes a cross-silo enterprise data acquisition, reporting and analysis tool ("the tool") 501 which, in some embodiments, is a software application that operates on top of and extends the functionality of the data intake and query system 108. In other embodiments, the functionalities of the tool 501 and the data intake and query system 108 can be combined into a single component or module. Together, the data intake and query system 108 and the tool 501 form a cross-silo enterprise data intake and query system, i.e., system 500.

The tool 501 and the data intake and query system 108 cooperate to gather machine data (e.g., server log events) and human-generated data (e.g., sales leads, customer data) from multiple data sources across different organizations or departments ("silos") within an enterprise (e.g., sales, marketing, engineering, human resources). The machine data is obtained by the data intake and query system 108 from one or more machine data sources 502 and can include for example, web server logs, activity logs, etc. Human-generated data can include, for example, sales data or marketing data relating to a business enterprise, trouble ticket data, etc. Some human generated data may be input directly to the tool 501 by one or more users 505, while other human generated data may be acquired from one or more external sources 503, such as various third-party provided software applications, e.g., Salesforce, Open-Air, NetSuite, Jira, Workday, etc. The data intake and query system 108 may store the machine data and the human generated data in a shared data storage facility 507. In some embodiments, the machine data is stored as time indexed events as described above, while the human generated data is also timestamped but stored in one or more lookup tables. This allows the human generated data to be easily manipulated and corrected by an individual end user. It is configurable whether or not editing of human generated data is allowed.

In certain embodiments the tool 501 uses the data ingest and search functionality of the data intake and query system 108, to access real time, heterogeneous, unstructured data and visualize results as reports, dashboards etc. The tool 501 can extend the functionality of the data intake and query system 108 by:

1. providing a framework for creating/recording human generated data, allowing that data to be combined with machine data that the data query system ingests.
2. presenting custom work flows for purpose-built analytics including data preparation, data mash-ups, KPI/metric definition, and visualization.

3. facilitating collaboration across silos and hierarchies and role based access to different granularities of data.
4. implementing connectors to external data sources as custom search commands.
5. iterating on feedback/analysis results by using result data sets as input to the other analytics tasks.

Figure 6:
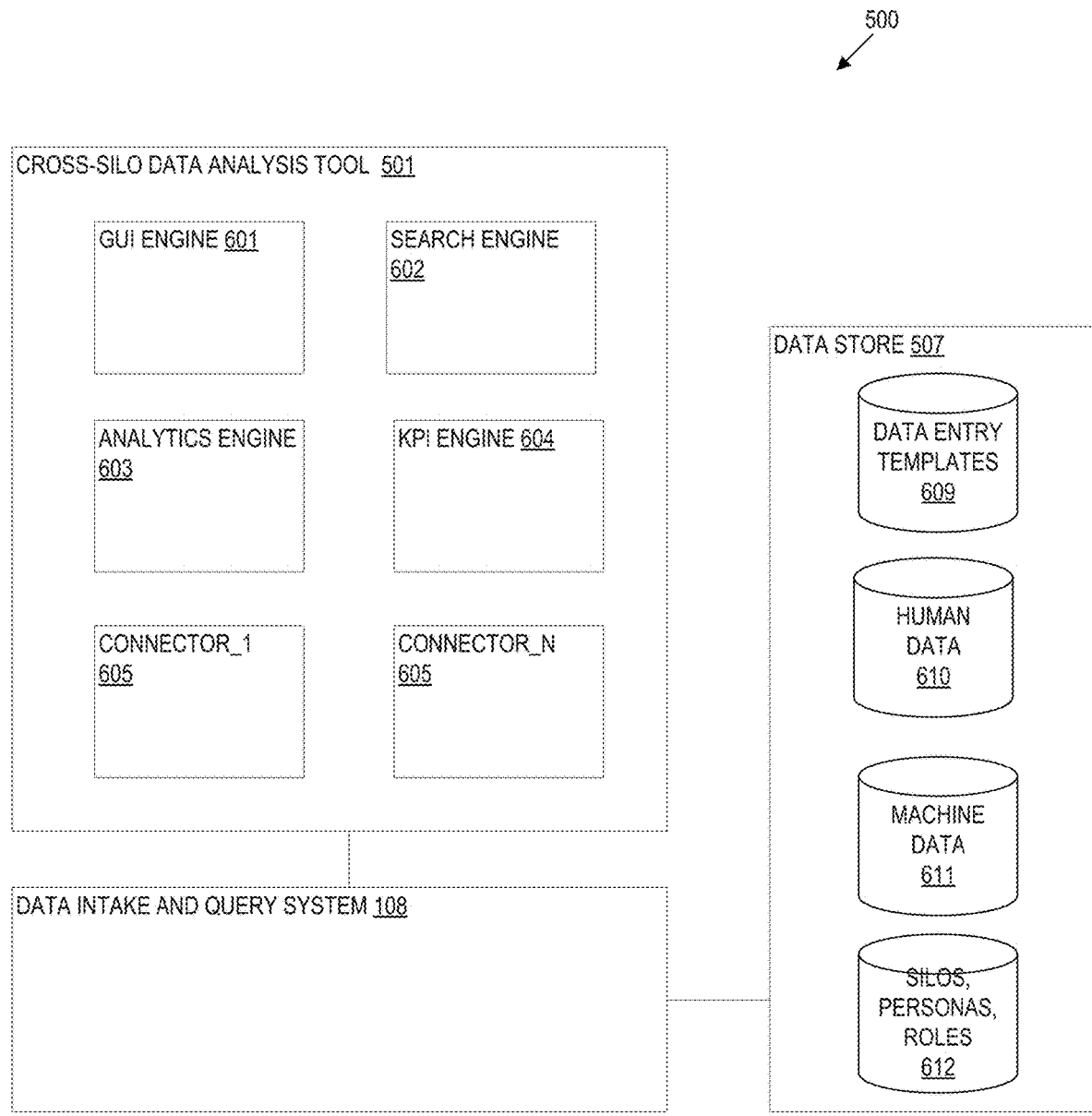
FIG. 6 illustrates the cross-silo enterprise data acquisition, reporting and analysis system in greater detail.

FIG. 6 illustrates an example of the system 500 in greater detail. As shown, the data store 507 includes both human data 610 and machine data 611. Additionally, the system 500 stores data representing various data entry templates 609 and other data defining silos, personas and roles 612. The data entry templates 609 can be customized by one or more administrators to specify data entry screens that will be used by end users to enter human generated data, as described further below.

In the illustrated embodiment, the tool 501 includes a number of components, including a GUI engine 601, a search engine 602, an analytics engine 603, a KPI engine 604, and one or more connectors 605. The GUI engine 601 generates the various GUIs described herein, including display screens with various input fields, menus, user controls, etc. The search engine 602 enables an end users to search stored data stored in the data store 507, including machine data and human generated data. In certain embodiments, the search engine 602 may be omitted and its functionality provided by the data intake and query system 108. The KPI engine 604 computes the various KPIs defined in the system 500, based on acquired machine data and/or human generated data. The computed KPIs are accessible to authorized users through display screens generated by the GUI engine 601, as described further below.

The analytics engine 603 includes various functions that can be invoked by users to analyze data, including various heuristics and/or machine learning algorithms for categorizing data, generating predictions on data, etc. Such analytics might include, for example, graphical displays (e.g., charts, graphs, tables, lists) of information such as trouble ticket tracking data obtained as a live feed or cross-customer escalation data from a customer relations management (CRM) application, or comparisons between customers, or comparisons of performance between silos of the enterprise.

Each connector 605 is designed to obtain real-time (in-the-moment) data from a corresponding third-party provided software application, such as a CRM application, an enterprise resource planning (ERP) application, a human resource information system (HRIS), a bug/issue tracking application, a lightweight directory access protocol (LDAP), etc. Examples of such real-time data might include a list of accounts owned by a given sales representative, a count of open technical support cases by disposition for a given account, a sales opportunity pipeline, manager hierarchies, etc. In certain embodiments each connector 605 is custom-built software code module designed to invoke the third-party application's application programming interface (API). In certain embodiments a connector 605 invokes the corresponding third party application's API via the data intake and query system 108, by passing a command to the data intake and query system 108. This allows the user to pass a query using the native language of that API (e.g., SOQL in the case of Salesforce) and translate the results into the streaming search results format of the data intake and query system 108. Consequently, the API results can be presented to the user like results that come from indexed data. The data, once in a search result format of the data intake and query system 108, can then be manipulated by the processing language of the data intake and query system 108 (e.g., SPL in the case of Splunk Enterprise).

In certain embodiments, at least some of the connectors 605 provide live feeds of data from their third-party applications, rather than indexed data, to enable the system 500 to reflect the current state of the business and not just a snapshot of time. However, connectors 605 also provide the ability to snapshot the state of the business over time. This can be done by pulling data into the data intake and query system 108 by way of an SPL search on a specified schedule and calculating/maintaining essential business KPIs over-time.

Depending on the connector and the complexity of options with the API, the system may also provide a GUI interface for the setup and manageability of certain connectors 605. Other more simplistic connectors may be configured by using a configuration file.

As mentioned above, the system 500 allows an administrator to define various personas and roles for users, across multiple business verticals or silos of an enterprise. In certain embodiments both roles and personas are used for access control. However, a persona is distinguishable from a role, in that a persona is based on a common job function, business deliverable or business objective of the users with whom it is associated. In contrast, a role is tied to capabilities for manipulating content, such as data, KPIs, metrics, dashboards, reports, etc. There can be a many-to-many mapping between personas and roles. For example, a particular persona defined as Sales Director may have various possible roles, such as a Pipeline Editor role that allows read and write access to sales pipeline-related data, and also Professional Services Activity Viewer role that allows read access but not write access to the same data. Similarly, a Professional Services Manager persona would likely not be assigned a Pipeline Editor role or even a Pipeline Viewer role but might be permitted to edit professional services related data and perhaps view certain account-related data.

Figure 7:
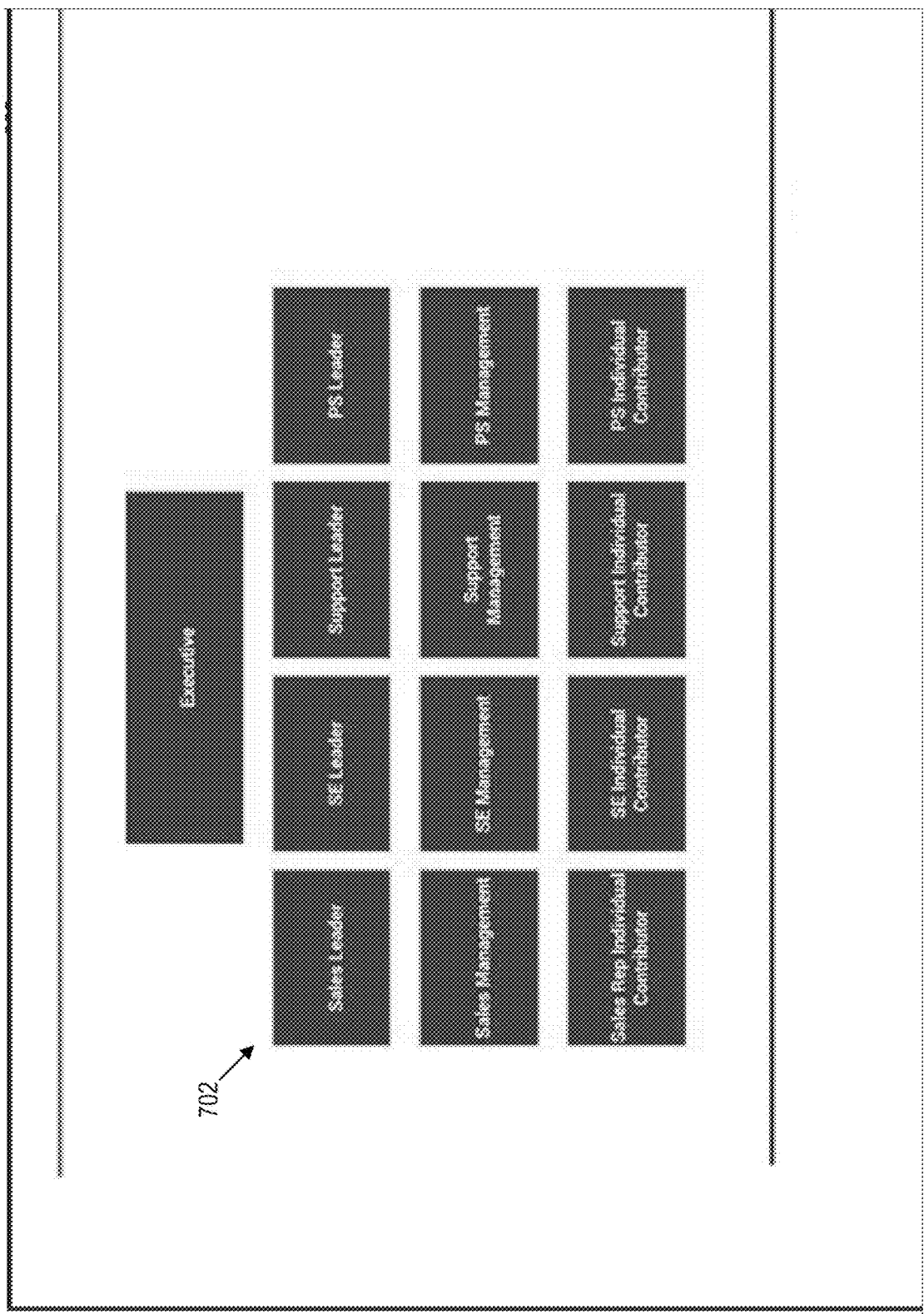
FIG. 7 shows an example of an initial landing screen that illustrates how personas can relate to silos of an enterprise.

Personas are used to control access to KPIs, as described further below. FIG. 7 shows an example of an initial landing screen that can be provided by the GUI of the tool 501, and illustrates how personas can relate to the verticals or silos of a business enterprise. Each of the rectangles in FIG. 7 is a button representing a different persona. When a user clicks on one of the personas with which the user has been previously associated, the user is taken to another screen from which the user can access the data and/or KPIs that the user is permitted to access through that persona.

As shown, personas can be logically organized into a matrix whose columns represent the silos (departments, groups, etc.) within the enterprise and whose rows represent hierarchical personal levels within each silo, as illustrated in FIG. 7. The silos in the illustrated example include, for example, Sales, Sales Engineering, Support, and Professional services ("PS"). Within each silo, a hierarchy of personas can be defined (e.g., by an administrator) to reflect relationships in job authority amongst the end users (e.g., supervisor/manager versus supervised/managed person). For example, in the Sales silo 702, the lowest level persona is Sales Rep Individual Contributor; individuals assigned to this persona report to one or more individuals assigned to the Sales Management persona. Individuals assigned to the Sales Management persona report to one or more individuals assigned to the Sales Leader persona. All individuals report to an individual or team assigned to the Executive persona (typically a "C-suite" executive).

The system 500 allows KPIs and other information to be scoped to the roles and personas of individual users, so that a given user does not see more information than the user needs to perform his or her job function. KPIs and other stored data are rolled up from individual contributors to their managers and leaders. In other words, a persona at the lowest level in the hierarchy (e.g., Sales Rep Individual Contributor) in a given silo can only access (view and manipulate) KPIs that are specifically assigned to that persona. However, the next higher level of persona in the hierarchy (e.g., Sales Management) can access all KPIs assigned to the lowest level of persona and additional KPIs, at least within the same silo; and so forth up the hierarchy.

Some personas may be permitted to access only KPIs defined for their own silo, particularly lower-level personas of the hierarchy. However, at least some personas may be permitted to access at least some KPIs for other silos. Additionally, the Executive persona in FIG. 7 can view KPIs across all silos.

Figure 8:
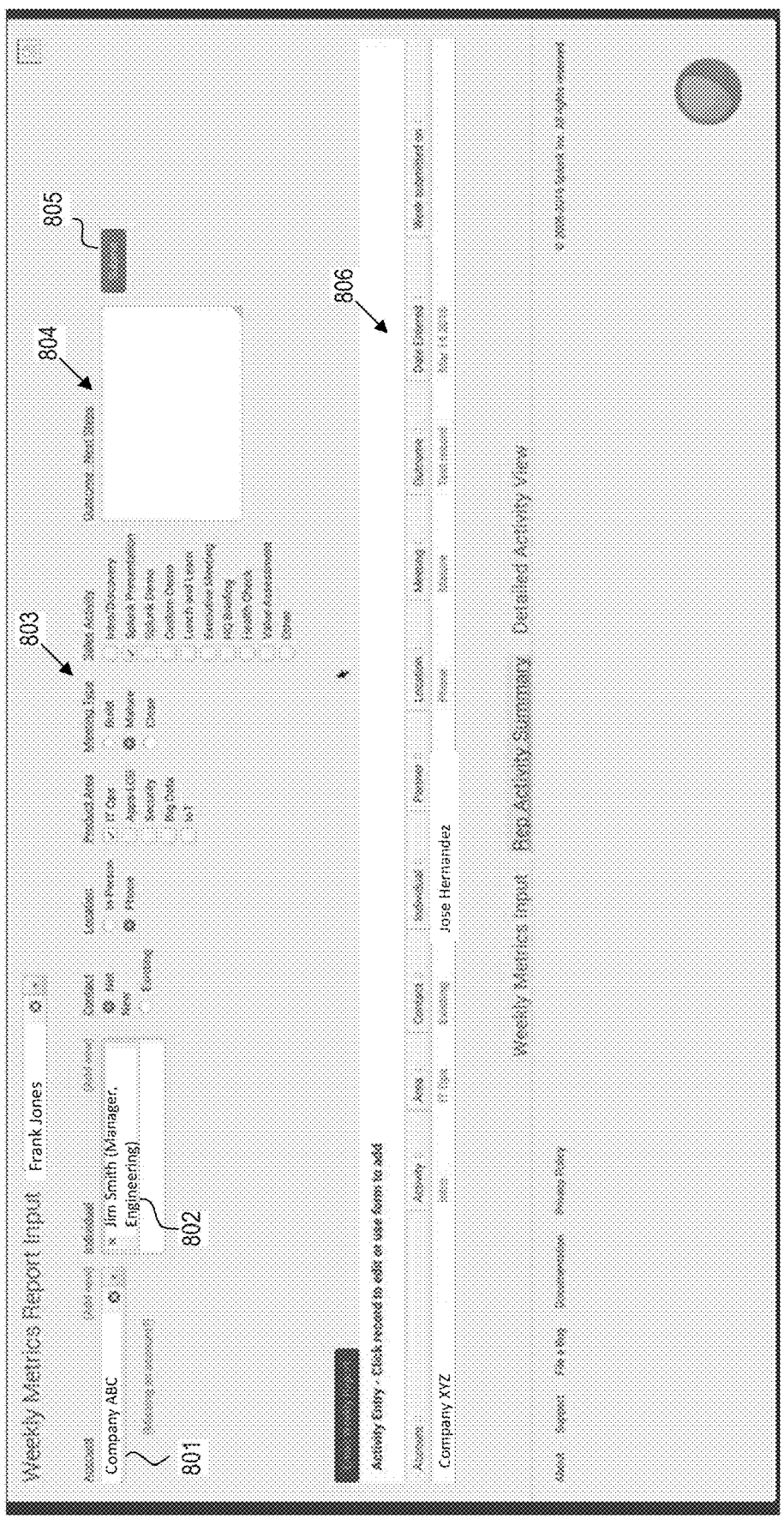
FIG. 8 illustrates an example of a data entry screen for inputting human-generated data to the cross-silo enterprise data acquisition, reporting and analysis system.

The system 500 provides a GUI that includes data entry screens for use by end users to input and store human-generated enterprise data in the system, which can be stored as timestamped event data and associated with related timestamped machine data. The data entry screens may be prestored templates (e.g., created or configured by an administrator), the content and/or layout of which may be specific to a particular persona or personas, and in some instances specific to a selected third-party software data source. FIG. 8 illustrates an example of such a data entry screen. The data entry screen is associated with a persona to which the user is assigned, as previously specified by an administrator. The screen itself may have been previously created by an administrator from a template, as described further below.

In some embodiments, before reaching the data entry screen, the user may first select, from a data source selector control (e.g., a pull-down menu), a particular third-party application as a data source from which to import data. In other embodiments, the data source selector control may be included on the data entry screen itself, which may then automatically reconfigure in response to the user's selection.

The screen illustrated in FIG. 8 allows a user assigned to a sales representative persona (e.g., Sales Rep Individual Contributor) to import data from a third-party CRM application, such as Salesforce, and to input additional activity data related to CRM, all of which may be stored together in the system 501 as a single timestamped event. The system 501 connects to the CRM application (e.g., by using a special purpose connector such as described above), pulls in the sales representative's contacts and customer data, and allows the sales representative to input additional information. For example, the screen in FIG. 8 includes an Account pulldown menu 801 and an Individual pulldown menu 802, for selecting a particular sales account (e.g., a particular customer company) and a particular individual associated with that sales account (e.g., customer contact), respectively. These pull down menus 801 and 802 are automatically populated with data from the CRM application by a corresponding connector, such as a connector 605 in FIG. 6, when the user selects the particular third-party application.

Additionally, the user can input additional (human generated) data into the data entry screen by clicking on various buttons or checkboxes 803, or by entering text into one or more fields, such as Outcome—Next Steps field 804. When the user clicks on the Submit button 805, a data event record is created and stored by the data intake and query system 108 as a combination of the imported third-party application data and the user-entered data, and is added as a line item in the lower portion 806 of the data entry screen. In certain embodiments, the lower portion 806 of the screen can display all event records created to date by the current user for the currently selected third-party application and persona. In other embodiments, only such event records created by the user during the current session are displayed. The lower portion can also display event records created during a user-specified time window (e.g., "this quarter" or "this month"). Hence, the user can filter the displayed records by time or any of various other criteria.

In certain instances, an event record created in this manner may be automatically associated with relevant stored machine data, and as such, it may also be searched and retrieved together with such machine data. For example, an event record containing CRM data (human generated data) related to a particular customer contact may be linked to web server login data (machine data) indicative of when that customer contact has accessed the enterprise's website and which web pages the customer contact has accessed. One or more data fields that appear in common between the human generated data and the machine data can be used to link (associate) these two types of data. For example, a customer contact may be assigned website login information (e.g., a username) with which to access the enterprise's website. That login information can be included in the human generated data input by the user or imported from the third-party application. The login information will also appear in the server logs generated by the enterprise's web server (machine data) when the customer contact accesses the website and, consequently, that information is indexed and stored by the data intake and query system 108.

The system 500 can use this common field as a link (association) between the machine data and the human-generated data. This link between the machine data and the human-generated data can be identified and used at search time in response to a search query, or it can be used to create a more direct link prior to search time, e.g., at the time the data is acquired by the data intake and query system 108 or at some later time prior to search time. Consequently, a user of the tool 501 (e.g., a sales representative) can search and retrieve both human generated data and related machine data related to particular customer contact, with a single SPL query submitted to the data intake and query system 108 via the tool 501.

Figure 9:
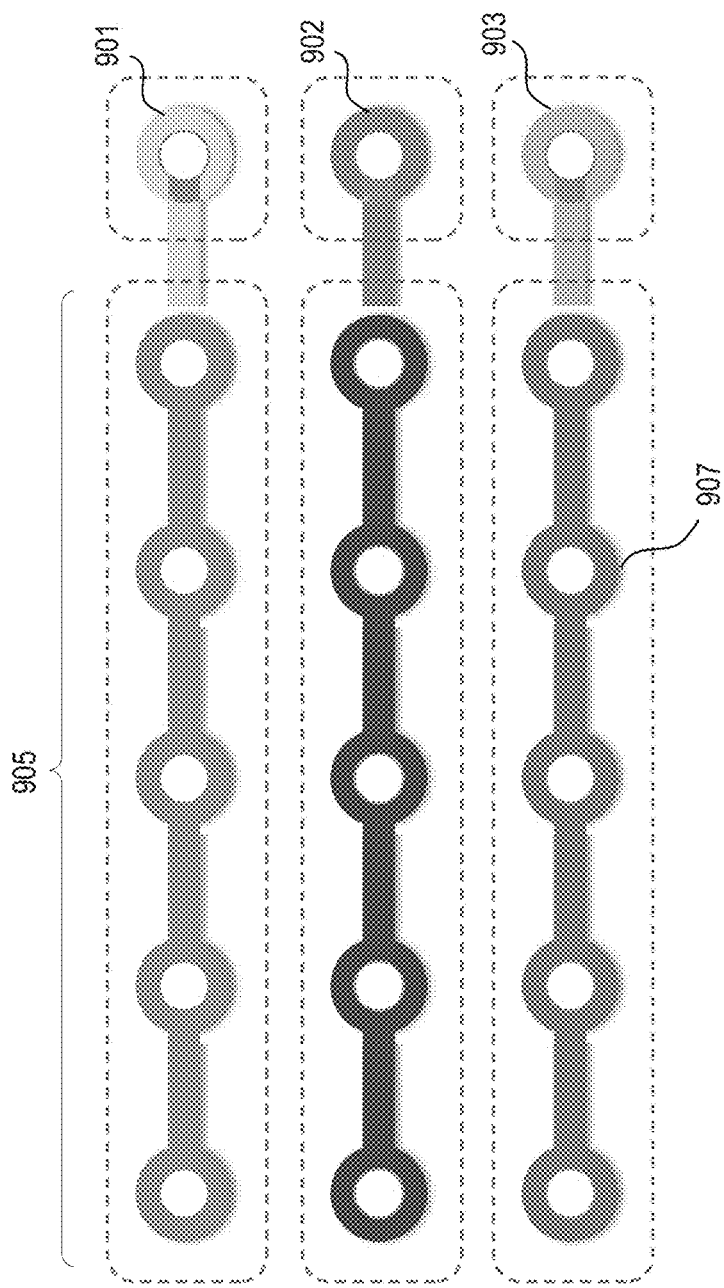
FIG. 9 shows an example of how KPIs can be computed based on other KPIs.
Figure 10:
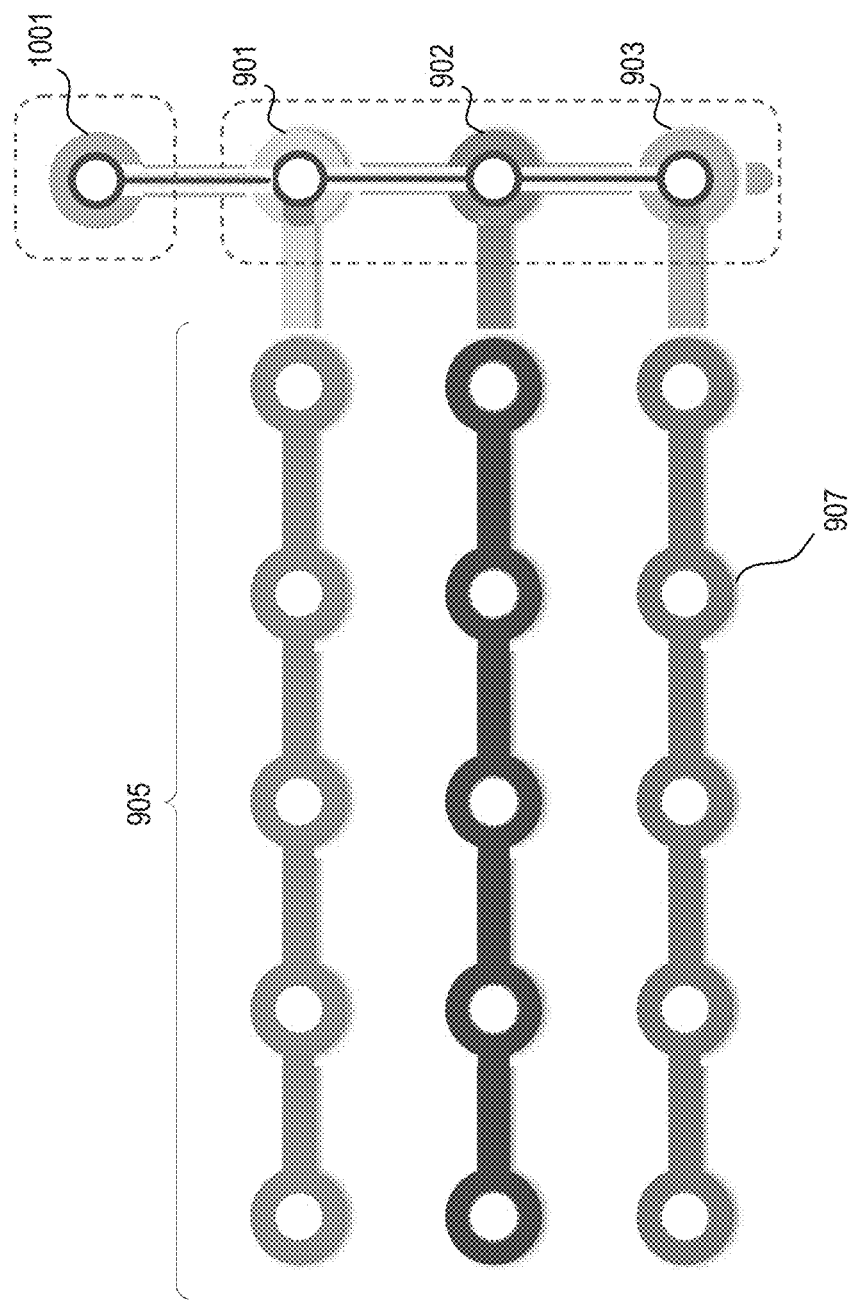
FIG. 10 shows another example of how KPIs can be computed based on other KPIs.

As mentioned above, the system 500 computes various KPIs from the acquired data. Each KPI is associated with one or more personas via one or more roles, and each persona has access to one or more KPIs via one or more roles, as described further below. KPIs and other stored data within a silo are rolled up from individual contributors to their managers and then up to the leaders. FIG. 9 conceptually illustrates an example of how KPIs can be computed based on other KPIs. Specifically, FIG. 9 conceptually illustrates three different KPIs 901-903, each of which is computed as a weighted sum 905 of several other KPIs (e.g., KPI 907), which can be referred to as sub-KPIs. Each sub-KPI may also be computed based on other sub-KPIs, and so on. Further, as shown in FIG. 10, the three computed KPIs 901-903 can be summed (or multiplied, or otherwise combined) in a weighted manner to produce another KPI 1001. In certain embodiments the GUI of the system 500 enables an administrator to specify which KPIs are to be computed for, and made accessible to, each persona, including specifying the sub-KPIs to be used in computing any given KPI and how those sub-KPIs are to be weighted. In some embodiments, at least some end users may also be given the capability to define KPIs for their own personas.

Figure 11:
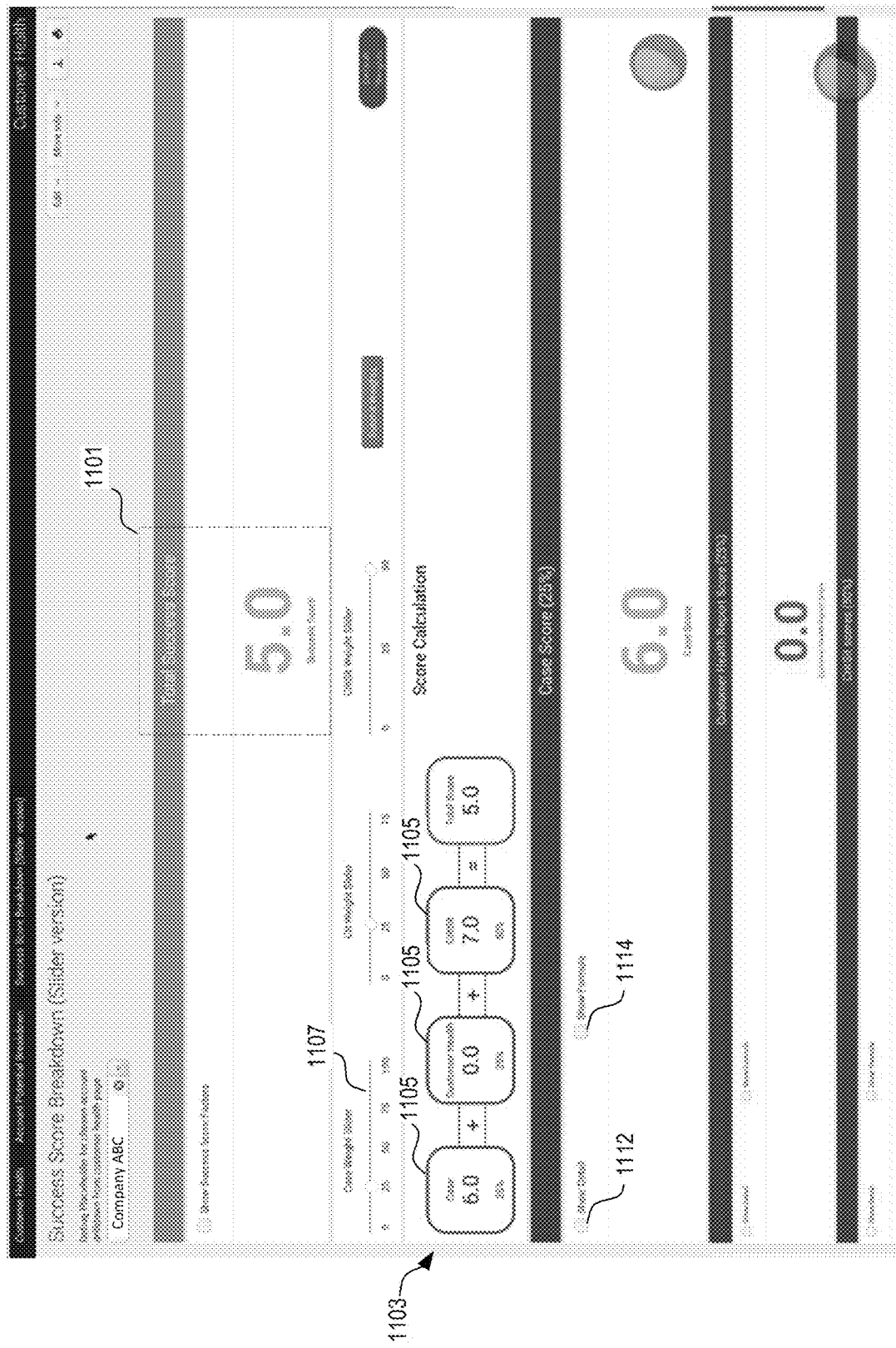
FIG. 11 illustrates an example of a display screen by which a user can view and manipulate one or more KPIs.
Figure 12:
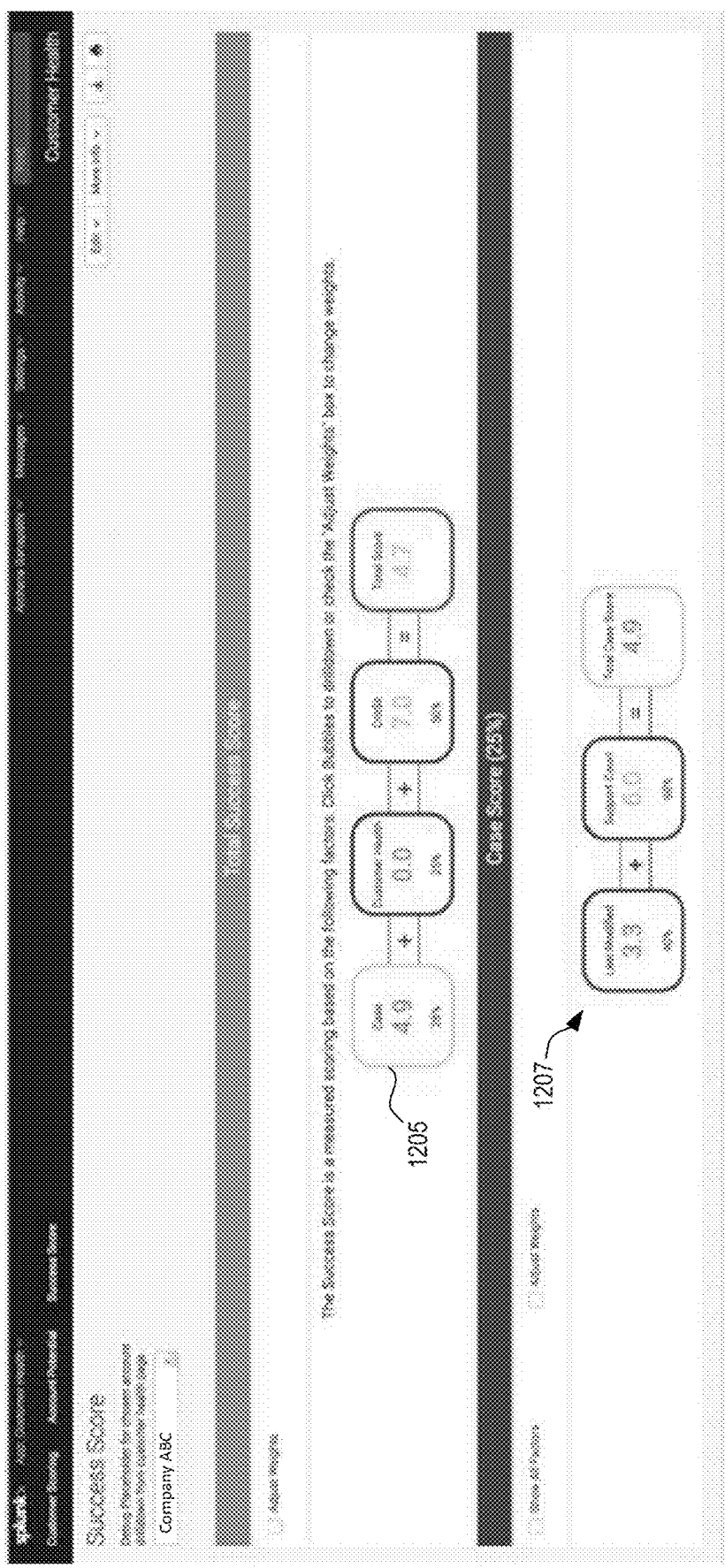
FIG. 12 shows how clicking on a KPI bubble expands the view to show the formula used to compute the KPI.

FIG. 11 illustrates an example of a display screen by which a user can view and manipulate one or more KPIs associated with a persona to which he or she is assigned. The illustrated example displays a KPI 1101 called Total Success Score. The middle part of the screen 1103 further shows that Total Success Score is computed as a weighted sum of three other KPIs, called Case, Customer Health and CritSit (critical situation score). Each of these other KPI, in turn, can also be a weighted combination of two or more other KPIs (sub-KPIs), or can be computed directly from stored data (e.g., the types of data discussed above). The user can click on (or otherwise select) the bubble 1105 containing any displayed sub-KPI to view the KPIs and/or the underlying data from which that sub-KPI was computed. For example, as shown in FIG. 12, clicking on the Case score bubble 1205 will cause the current formula for the Case score KPI to appear in the Case region 1207.

The user can add KPIs to, or remove KPIs from, the calculation of any given KPI, or adjust the weight of any KPI used in the calculation of another KPI. As shown in FIG. 11, when the calculation for a given KPI is displayed, as in the case of Total Success Score, a weight adjustment slider bar control 1107 is displayed for each other KPI (sub-KPI) used in the calculation. The user can move the corresponding slider bar to adjust the weight of any sub-KPI used in the calculation. In response to such a user input on any one of the weight controls 1107, the tool 501 will automatically and proportionally adjust the weights for the other sub KPIs so that sum of their weights is always 100. The Show Detail checkbox 1112, when checked by the user, causes sub-KPIs and weights to be displayed for indicated KPI. The Show Formulas checkbox 1114, when checked by the user, causes display of the equation to be used to calculate a low-level metric or most basic KPI calculated directly from underlying data. In some embodiments this equation is specified a priori and not modifiable by end user.

Figure 13:
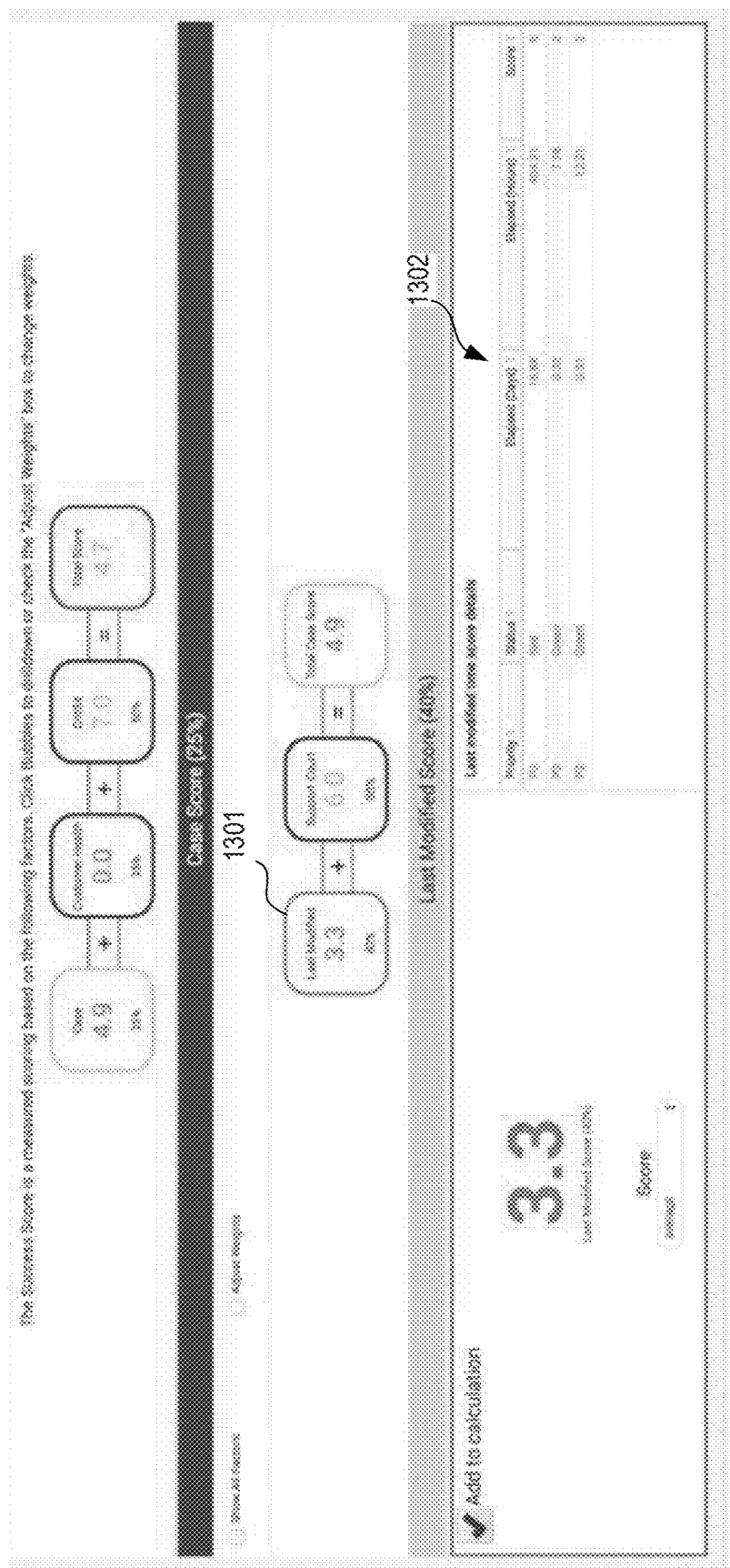
FIG. 13 shows an example of how the system can display the underlying data in relation to a particular KPI.

In some embodiments, when the user clicks on a KPI that is computed directly from the underlying data (i.e., not from other KPIs), the system 500 causes the underlying data from which the KPI is computed to be displayed. For example, referring to FIG. 13, when the user clicks on the Last Modified score bubble 1301, the system displays the underlying data in data window 1302.

Figure 14:
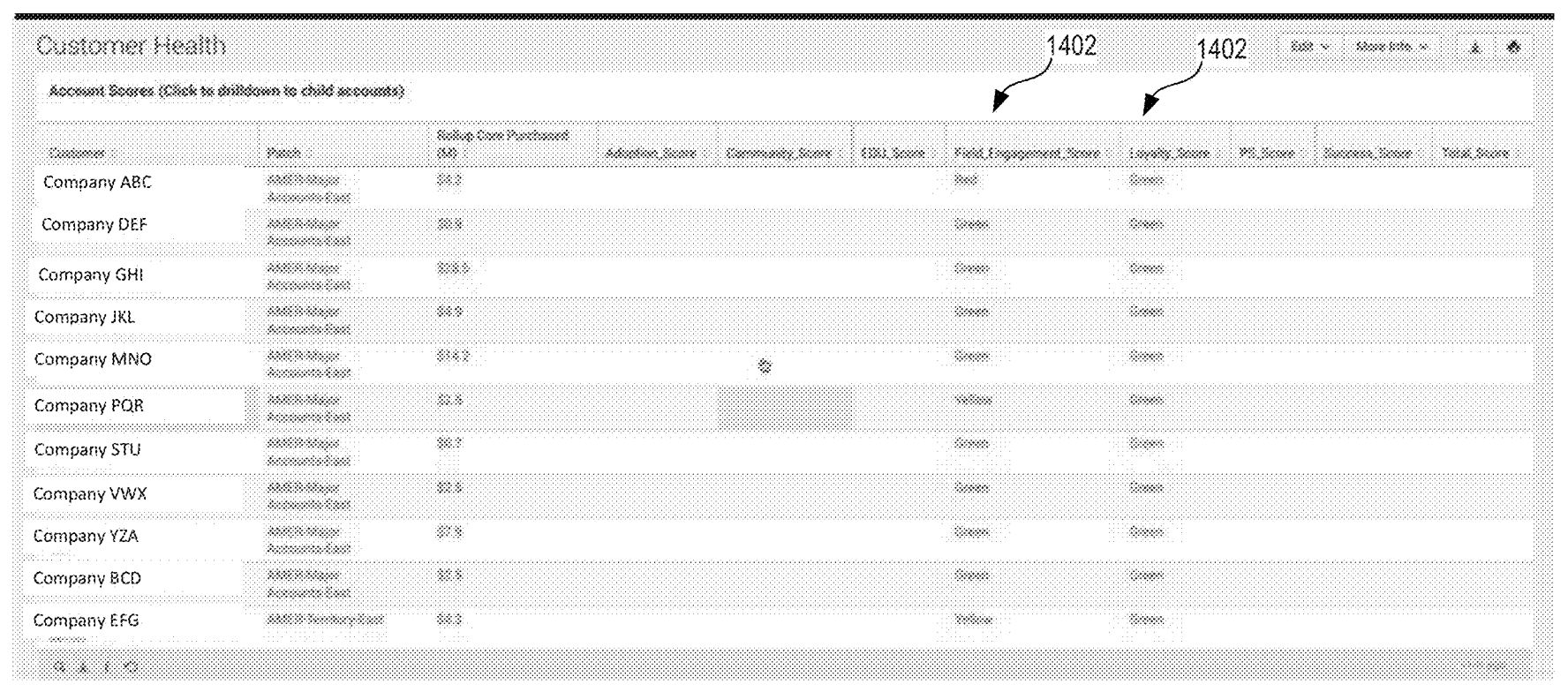

FIG. 14 illustrates another GUI screen by which a user can view the underlying data. In particular, FIG. 14 shows a Customer Health screen, in which the user can view customer health scores for multiple customer. Color names indicated in the score columns 1402 indicate the scores' current ranges (e.g., where green indicates within ideal range, yellow indicates slightly outside of ideal range, and red indicates substantially outside of ideal range). Clicking on a cell in a column 1402 that contains data takes the user to a score calculation screen for that KPI score, such as shown by example in FIG. 11.

Figure 15:
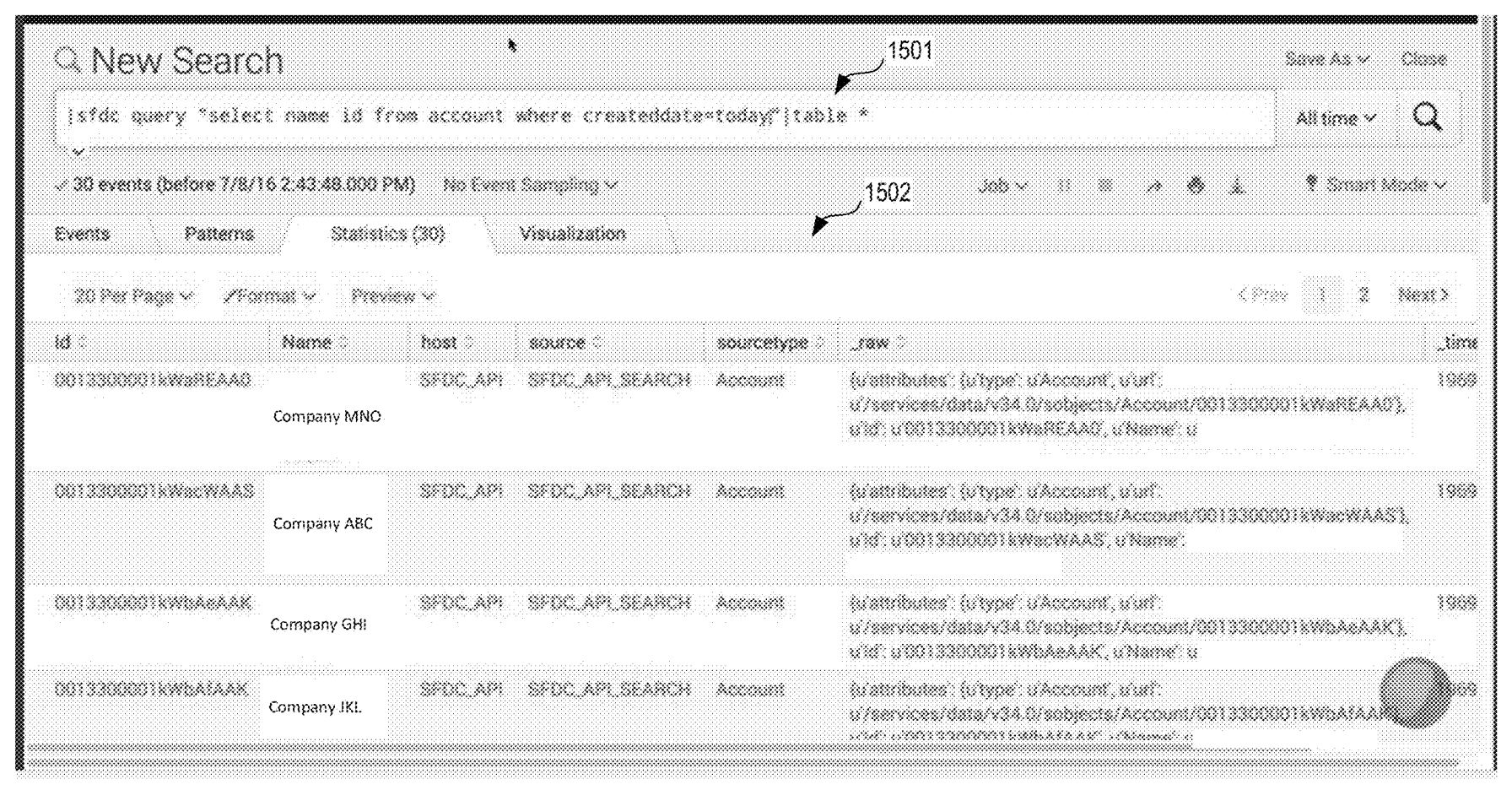

An end user can also use the system 500 to initiate search queries of the underlying data and view results of those queries. The search functionality can be provided by the data intake and query system 108, or alternatively by the search engine 602 of the tool 501 (FIG. 6) or. FIG. 15 illustrates an example of a search screen from which a user can initiate a search query and view search results. The search screen includes a query bar 1501 into which the user can type an SPL query (an example of which is shown). The lower part 1502 of the screen is for viewing search results and related data, and includes several tabs, including an Events tab for viewing the event data that make up the search result, a Patterns tab for viewing patterns represented by the search result, a Statistics tab (shown currently selected) for viewing statistics regarding the search result, and a Visualizations tab for viewing various graphical visualization of the search result. The Statistics tab is shown currently selected and includes (among other information) the raw data associated with the retrieved events, and may be a simple aggregation or group. The example of FIG. 15 shows an example data that may have been acquired or derived from a third-party CRM application such as Salesforce.

In certain embodiments the system allows an administrator to define personas, to assign end users to those personas, to define data entry screens for enabling end users to input various types of human-generated data for storage as event data in association with machine data, and to assign those data entry screens to particular personas.

Figure 16:
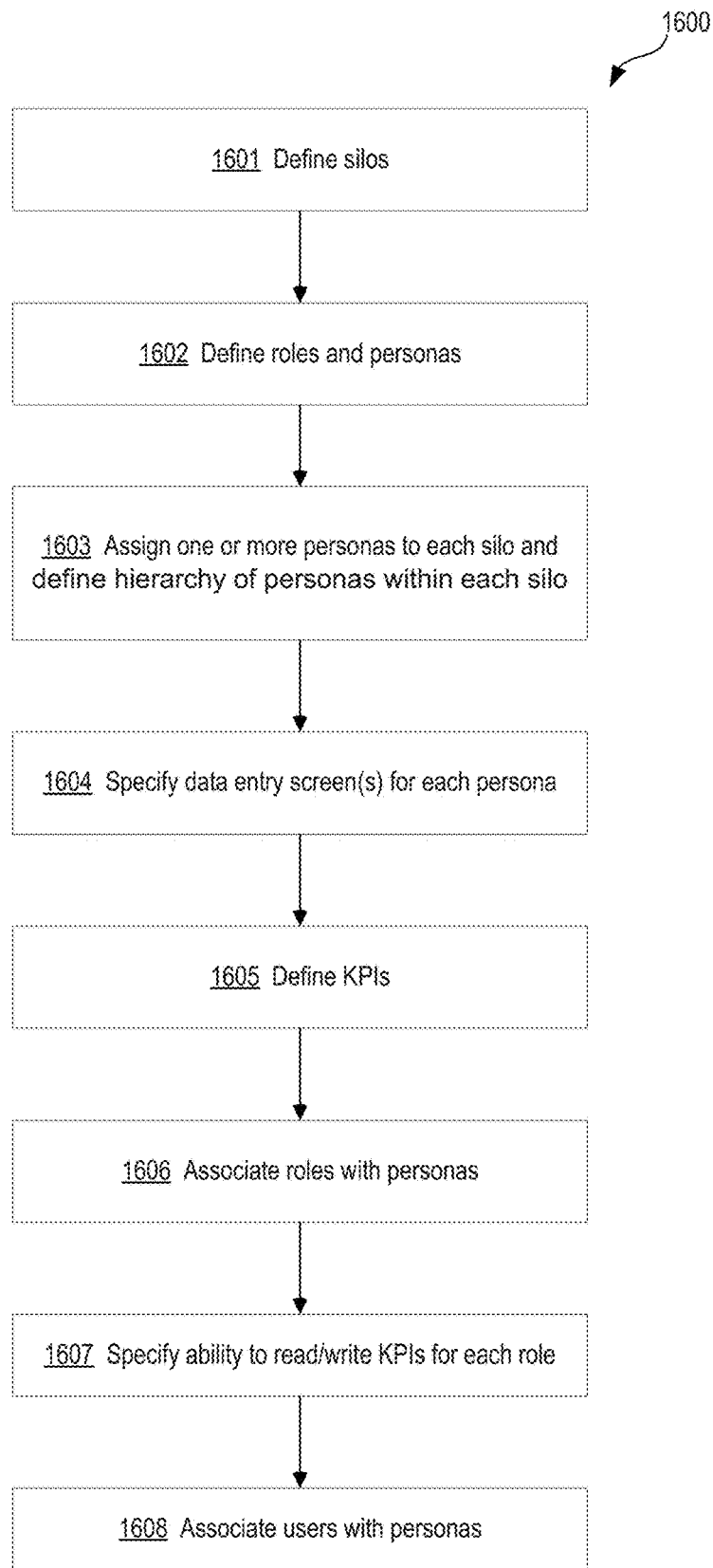
FIG. 16 is a flow chart illustrating a process by which an administrative user of the system ("administrator") can configure the system for end users.

FIG. 16 illustrates a process 1600 by which an administrative user of the system ("administrator") can use an administrative GUI of the tool 501 to configure the tool 501 for use by end users. Note that the steps of process 1600 do not necessarily have to be performed in the order shown and described here. Initially, at 1601 the administrator defines a number of silos for an enterprise that will be using the system. This step may include, for example, the administrator typing a name for each of the one or more silos, into an alphanumeric input field in a GUI screen. At 1602 the administrator defines the various roles and personas that will be associated with the end users, e.g., the employees of the enterprise. This step may involve, for example, the administrator inputting a unique name for each of the roles and each of the personas, into an alphanumeric input field in one or more GUI screens. For example, the tool 501 may provide one GUI screen for defining roles and another GUI screen for defining personas. At step 1603 the administrator assigns one or more of the personas to each silo and defines a hierarchy of the personas within each silo. This step may be done concurrently with defining a persona; for example, the administrator may use the same GUI screen to define a persona and to assign the persona to a silo and to a particular level within that silo relative to other personas in that silo (if any). The hierarchy determines the manner in which KPIs are rolled up to personas within the silo. At step 1604 the administrator specifies at least one data entry screen for each persona. At step 1605 the administrator defines one or more KPIs that the tool will compute based on the acquired enterprise data, including their formulas and default weights. In some embodiments, a set of predefined KPIs may be provided programmatically in the tool 501.

In general, an end user's access to KPIs (i.e., ability to read and/or write KPIs) depends on the persona(s) and role(s) associated with that end user. More specifically, access to KPIs is defined in roles, and roles are associated with personas, and end users are also associated with personas. Hence, KPIs are associated with personas by virtue of the association of roles with personas. An end user is associated via a persona with one or more roles, and therefore, has the ability to access the KPIs to which the role(s) associated with his/her persona have access. An end user has access to all KPIs to which the roles associated with that user's persona have access. Each persona has access to all KPIs to which any persona lower than it in the hierarchy (if any) have access within the same silo and, typically, additional KPIs to which personas lower in the hierarchy (if any) do not have access.

Thus, how a persona can interact with KPIs is controlled, in certain embodiments, by the role mapping of the persona and the capabilities assigned to the role. The following is an example of capabilities assigned for how a persona interacts with a KPI.

1) Persona A has been assigned roles X and Y
2) Persona B has been assigned role Y
3) Persona C has been assigned roles Y and Z 4) Role X can edit KPI 1, KPI 2 and KPI 3
5) Role Y can read KPI 1 and edit KPI 2 but can do nothing with KPI 3.
6) Role Z can read KPI 1 and KPI 2 and can edit KPI 11 and KPI 12
7) Persona B reports to Persona A in the hierarchy
8) Persona C may be a peer of Persona A from a different organization Referring still to FIG. 16, at step 1606, the administrator associates each of the defined roles with one or more of the defined personas. This step can include, for example, the administrator selecting from a list of available roles in a GUI screen that relates to a particular persona. This step may be done concurrently with defining a persona; for example, the administrator may use the same GUI screen to define a persona and to assign roles to the persona (e.g., by selecting from a list of available roles in a GUI screen that relates to the persona). Alternatively, this step may be done concurrently with defining a role; for example, the administrator may use the same GUI screen to define a role and to assign the role to a persona (e.g., by selecting from a list of available personas in a GUI screen that relates to the role).

At step 1607, for each defined role, the administrator specifies the role's ability to read and/or write the various KPIs. The system 500 stores indications of access rights to the various KPIs for each of the defined roles. The user then associates each end user with one or more of the defined personas at step 1608, which has the effect of selectively providing the end users with access to different KPIs, by virtue of the association of roles with personas. This step can include, for example, the administrator selecting from a list of available users in a GUI screen that relates to a particular persona.

Figure 17:
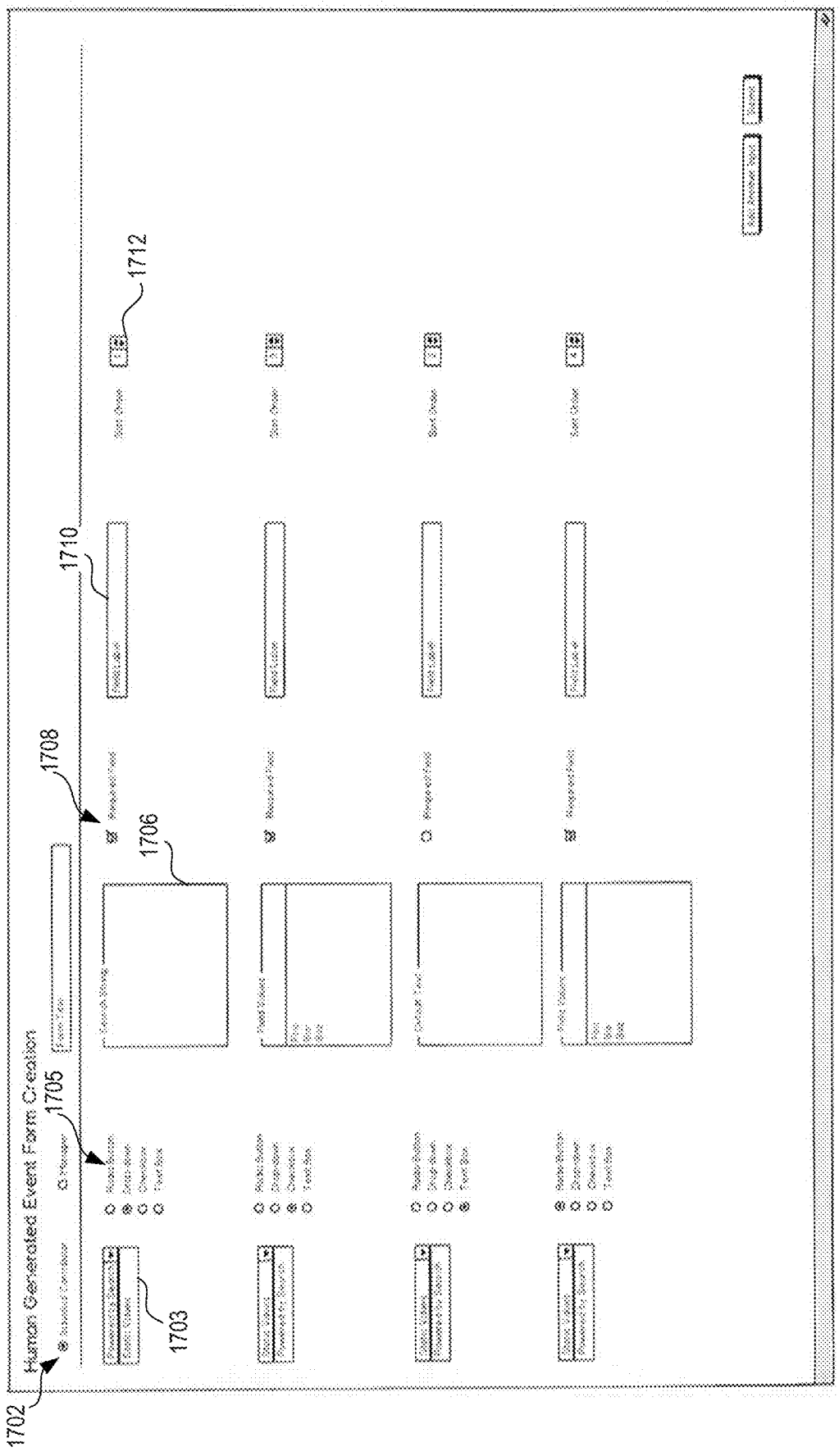
FIG. 17 shows an example of a template display screen that an administrator can use to create an end user data entry screen for a given persona.

In certain embodiments, the end users' data entry screens are created (step 1604) by an administrator from pre-existing templates. FIG. 17 shows an example of such a template display screen, i.e., a display screen that an administrator can use to create an end user data entry screen with multiple input fields, for a given persona. FIG. 8, discussed above, shows an example of an end user data entry screen that may be created in this manner. In the example of FIG. 17, the administrator clicks on a radio button 1702 to designate which type of persona the resulting data entry screen will be serving, i.e., either Individual Contributor or Manager in this example. The administrator can specify two types of input fields for the data entry screen: search-based ("powered by search") and static value. For each input field, the user specifies the type of input by selecting the type from a pulldown menu 1703. If the input is a static value, the administrator selects a radio button 1705 to indicate the type of input it will be, e.g., radio button, drop-down menu, checkbox or text box. If the input is search based, the user specifies what the populating search is in search string field 1706. The administrator further indicates in checkbox 1708 whether the input field is a required or optional input, specifies a text label for the input in text field 1710, and specifies the order that the input field will be displayed to the end user in the final data entry screen in pulldown menu 1712. In at least some embodiments, other elements of the form (where the data is stored, URL of the form, etc.) may be determined programmatically rather than by the administrator, although in other embodiments, even these factors may be specified by the administrator.

Figure 18:
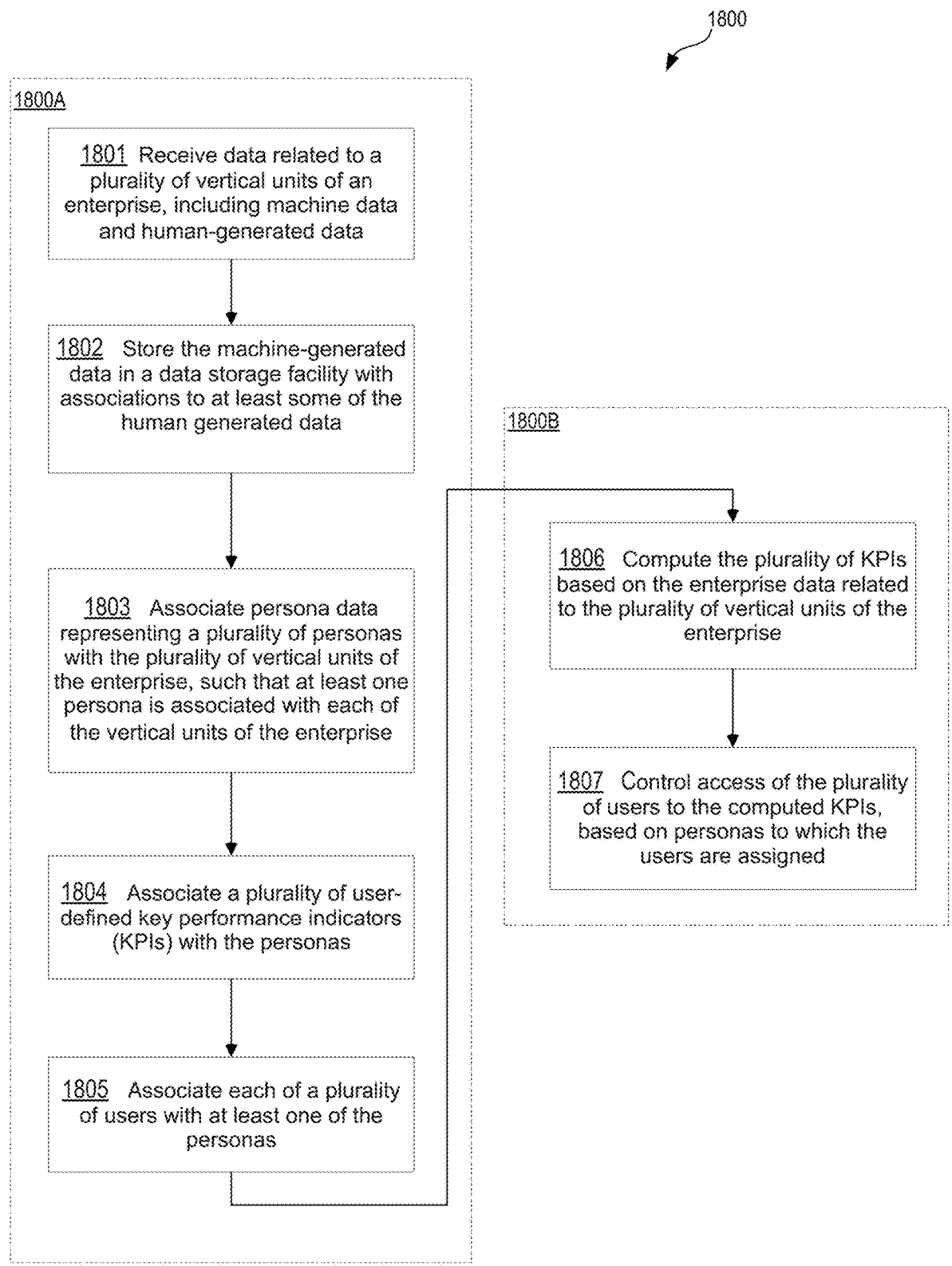
FIG. 18 illustrates an example of an overall process that can be performed by the system, including a setup phase and a runtime phase.

FIG. 18 illustrates an example of an overall process that can be performed by the system 500, including a setup phase 1800A and a runtime phase 1800B. Note that the steps of process 1800 do not necessarily have to be performed in the order shown and described here. In the setup phase 1800A, at step 1801 the system 500 receives enterprise data related to various vertical units of an enterprise, including machine-generated data and human-generated data. The system 500 stores the machine-generated data with associations to at least some of the human generated data at step 1802, and associates persona data representing a plurality of personas with the plurality of vertical units of the enterprise at step 1803 (e.g., based on user inputs), such that at least one persona is associated with each of the vertical units. At step 1804 the system 500 associates a plurality of KPIs with the personas (e.g., based on user inputs). This may be done by associating read/write permissions for the KPIs with various roles and then selectively associating the roles with personas, as described above in relation to FIG. 16. At step 1805 the system 500 associates each of a plurality of users with at least one of the personas (e.g., based on user inputs). This has the effect of selectively providing the users with access to different KPIs, via the personas and roles. Subsequently, in the runtime phase 1800B, the system 500 computes the KPIs based on the enterprise data at step 1806, and controls access by the users to the computed KPIs, based on personas to which the users are assigned, at step 1807 (e.g., by virtue of the roles that are assigned to the personas to which each user is assigned).

Figure 19:
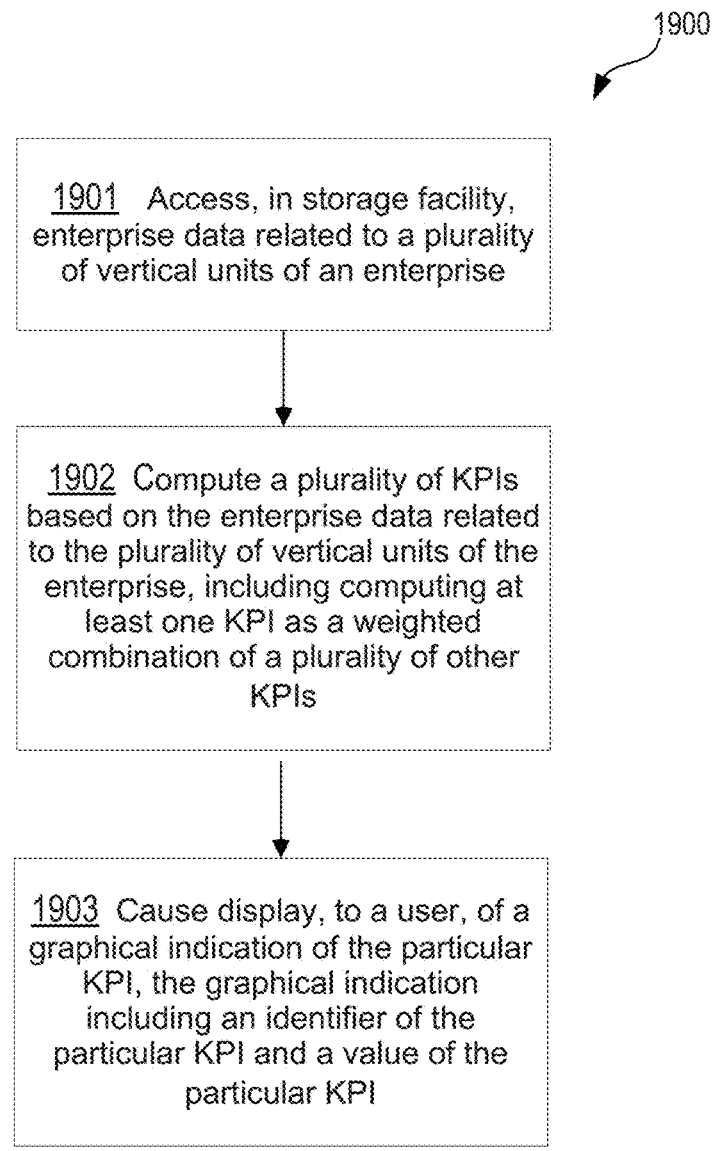
FIG. 19 shows an example of a runtime phase process that can be performed by the system to compute KPIs.

FIG. 19 shows an example of a process 1900 that can be performed by the system 500 to compute KPIs. Note that the steps of process 1900 do not necessarily have to be performed in the order shown and described here. At step 1901 the system 500 accesses, in a storage facility such as data store 507, enterprise data related to a plurality of vertical units, or silos, of an enterprise. The system 500 then computes a plurality of KPIs based on the enterprise data at step 1902, including computing at least one (and possibly many) KPI as a weighted combination of a plurality of other KPIs (sub-KPIs). At step 1903 the system 500 causes a display device used by the end user to display, to the user, a graphical indication of the particular KPI, where the graphical indication includes at least an identifier (label) of the particular KPI and a value of the particular KPI. The graphical indication may also include the formula used to compute the particular KPI, which including any other KPIs from which the KPI was computed and their weights.

Figure 20:
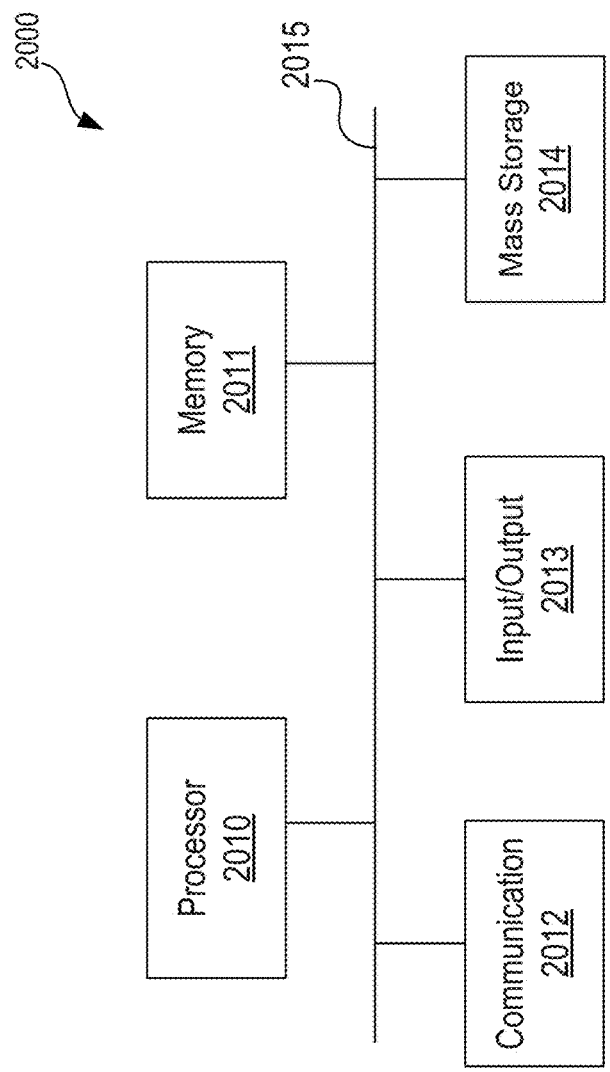
FIG. 20 shows a high-level example of a hardware architecture of a processing system that can be used to implement any one or more of the functional components described herein.

FIG. 20 shows a high-level example of a hardware architecture of a processing system that can be used to implement any one or more of the functional components referred to above (e.g., the tool, forwarders, indexer, search head, data store). One or multiple instances of an architecture such as shown in FIG. 20 (e.g., multiple computers) can be used to implement the techniques described herein, where multiple such instances can be coupled to each other via one or more networks.

The illustrated processing system 2000 includes one or more processors 2010, one or more memories 2011, one or more communication device(s) 2012, one or more input/output (I/O) devices 2013, and one or more mass storage devices 2014, all coupled to each other through an interconnect 2015. The interconnect 2015 may be or include one or more conductive traces, buses, point-to-point connections, controllers, adapters and/or other conventional connection devices. Each processor 2010 controls, at least in part, the overall operation of the processing device 2000 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 2011 can be or include one or more physical storage devices, which may be in the form of random access memory (RAM), read-only memory (ROM) (which may be erasable and programmable), flash memory, miniature hard disk drive, or other suitable type of storage device, or a combination of such devices. Each mass storage device 2014 can be or include one or more hard drives, digital versatile disks (DVDs), flash memories, or the like. Each memory 2011 and/or mass storage 2014 can store (individually or collectively) data and instructions that configure the processor(s) 2010 to execute operations to implement the techniques described above. Each communication device 2012 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 2000, each I/O device 2013 can be or include a device such as a display (which may be a touch screen display), audio speaker, keyboard, mouse or other pointing device, microphone, camera, etc. Note, however, that such I/O devices may be unnecessary if the processing device 2000 is embodied solely as a server computer.

In the case of a user device, a communication device 2012 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 2012 can be or include, for example, any of the aforementioned types of communication devices, a wired Ethernet adapter, cable modem, DSL modem, or the like, or a combination of such devices.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   accessing, by a computer system, having a processor enterprise data stored in a storage facility, the enterprise data relating to an enterprise and including timestamped machine-generated data related to the performance or operation of one or more components in an information technology environment;
   causing, by the computer system, having a processor display of a user interface for receiving user input specifying human-generated data related to the enterprise;
   receiving, by the computer system, having a processor the user input specifying the human-generated data related to the enterprise;
   associating, by the computer system, having a processor a timestamp with the human-generated data to produce timestamped human-generated data;
   storing, by the computer system, having a processor the timestamped human-generated data in association with the timestamped machine-generated data as part of the enterprise data, wherein the timestamped human-generated data includes first timestamped human-generated data;
   receiving, by the computer system, having a processor additional human-generated data from each of a plurality of different external software applications, wherein said receiving includes using a different software-based connector to retrieve timestamped human-generated data from each of the plurality of different external software applications; and
   storing, by the computer system, having a processor the additional timestamped human-generated data in association with the first timestamped human-generated data and the timestamped machine generated data as part of the enterprise data.

2. The method of claim 1, further comprising:
   defining a plurality of vertical units of the enterprise in response to a first plurality of user inputs;
   defining a plurality of roles and a plurality of personas associated with the enterprise in response to a second plurality of user inputs, wherein each of the personas is distinct from each of the roles; and
   associating each of the plurality of personas with at least one vertical unit of the plurality of vertical units of the enterprise.

3. The method of claim 1, further comprising:
   defining a plurality of vertical units of the enterprise in response to a first plurality of user inputs;
   defining a plurality of roles and a plurality of personas associated with the enterprise in response to a second plurality of user inputs, wherein each of the personas is distinct from each of the roles, wherein each of the personas is defined to correspond to at least one of: a job function, a business deliverable or a business objective, of personnel of the enterprise; and
   associating each of the plurality of personas with at least one vertical unit of the plurality of vertical units of the enterprise.

4. The method of claim 1, further comprising:
   defining a plurality of vertical units of the enterprise in response to a first plurality of user inputs;
   defining a plurality of roles and a plurality of personas associated with the enterprise in response to a second plurality of user inputs, wherein each of the personas is distinct from each of the roles, wherein each of the personas is defined to correspond to at least one of: a job function, a business deliverable or a business objective, of personnel of the enterprise;
   associating each of the plurality of personas with at least one vertical unit of the plurality of vertical units of the enterprise; and
   associating each of a plurality of users, who are affiliated with the enterprise, with at least one persona of the plurality of personas, in response to third user inputs.

5. The method of claim 1, further comprising:
   computing, by the computer system, a plurality of performance indicators (KPIs) based on the enterprise data, including computing a particular KPI as a weighted combination of a plurality of sub-KPIs.

6. The method of claim 1, further comprising:
computing, by the computer system, a plurality of performance indicators (KPIs) based on the enterprise data, including computing a particular KPI as a weighted combination of a plurality of sub-KPIs; and
causing display to a user, by the computer system, of an indication of the particular KPI, the indication of the particular KPI including an identifier of the particular KPI, a value of the particular KPI, an identifier and corresponding value of each of the sub-KPIs, and a weight applied to each of the sub-KPIs in computing the particular KPI.

7. The method of claim 1, further comprising:
computing, by the computer system, a plurality of performance indicators (KPIs) based on the enterprise data, including computing a particular KPI as a weighted combination of a plurality of sub-KPIs;
causing display to a user, by the computer system, of an indication of the particular KPI, the indication of the particular KPI including an identifier of the particular KPI, a value of the particular KPI, an identifier and corresponding value of each of the sub-KPIs, and a weight applied to each of the sub-KPIs in computing the particular KPI;
receiving a user input directed to the particular KPI; and
in response to the user input directed to the particular KPI, causing the indication of the particular KPI to be expanded to indicate each of the sub-KPIs used in computing the particular KPI and the weight applied to each of the sub-KPIs in computing the particular KPI.

8. The method of claim 1, further comprising:
computing, by the computer system, a plurality of performance indicators (KPIs) based on the enterprise data, including computing a particular KPI as a weighted combination of a plurality of sub-KPIs;
causing display to a user, by the computer system, of an indication of the particular KPI, the indication of the particular KPI including an identifier of the particular KPI, a value of the particular KPI, an identifier and corresponding value of each of the sub-KPIs, and a weight applied to each of the sub-KPIs in computing the particular KPI;
causing display of a weight control corresponding to each of the sub-KPIs, each said weight control for enabling a user to adjust the corresponding weight;
receiving a second user input for operating one of the weight controls corresponding to a first sub-KPI of the plurality of sub-KPIs; and
in response to the second user input,
modifying the weight applied to THE first sub-KPI, and
automatically and proportionally adjusting the weights of each of the plurality of sub-KPIs used in computing the particular KPI, other than the first sub-KPI, so that the sum of the weights of all sub-KPIs used in computing the particular KPI remains equal to a specified constant.

9. The method of claim 1, further comprising:
defining a plurality of vertical units of the enterprise in response to a first plurality of user inputs;
defining a plurality of roles and a plurality of personas associated with the enterprise in response to a second plurality of user inputs, wherein each of the personas is distinct from each of the roles, and wherein at least two of the personas have a hierarchical relationship to each other; and
computing a set of key performance indicators (KPIs) for each of the at least two personas.

10. The method of claim 1, further comprising:
associating persona data that represents a plurality of personas with the plurality of vertical units of the enterprise, such that at least one persona is associated with each of the vertical units of the enterprise;
associating each of a plurality of users with at least one of the personas; and
associating the plurality of KPIs with the personas, such that each of the plurality of personas is associated with at least one KPI, wherein each user of the plurality of users has access to each KPI associated with any persona with which the user is associated.

11. A computer system comprising:
a communication device through which to communicate on a computer network; and
at least one processor operatively coupled to the communication device and configured to execute operations including
accessing enterprise data stored in a storage facility, the enterprise data relating to an enterprise and including timestamped machine-generated data related to the performance or operation of one or more components in an information technology environment;
causing display of a user interface for receiving user input specifying human-generated data related to the enterprise;
receiving the user input specifying the human-generated data related to the enterprise;
associating a timestamp with the human-generated data to produce timestamped human-generated data;
storing the timestamped human-generated data in association with the timestamped machine-generated data as part of the enterprise data, wherein the timestamped human-generated data includes first timestamped human-generated data;
receiving additional human-generated data from each of a plurality of different external software applications, wherein said receiving includes using a different software-based connector to retrieve time-stamped human-generated data from each of the plurality of different external software applications; and
storing the additional timestamped human-generated data in association with the first timestamped human-generated data and the timestamped machine generated data as part of the enterprise data.

12. The computer system of claim 11, the operations further comprising:
defining a plurality of vertical units of the enterprise in response to a first plurality of user inputs;
defining a plurality of roles and a plurality of personas associated with the enterprise in response to a second plurality of user inputs, wherein each of the personas is distinct from each of the roles; and
associating each of the plurality of personas with at least one vertical unit of the plurality of vertical units of the enterprise.

13. The computer system of claim 11, the operations further comprising:
defining a plurality of vertical units of the enterprise in response to a first plurality of user inputs;
defining a plurality of roles and a plurality of personas associated with the enterprise in response to a second plurality of user inputs, wherein each of the personas is distinct from each of the roles, wherein each of the personas is defined to correspond to at least one of: a job function, a business deliverable or a business objective, of personnel of the enterprise; and associating each of the plurality of personas with at least one vertical unit of the plurality of vertical units of the enterprise.

14. The computer system of claim 11, the operations further comprising:

defining a plurality of vertical units of the enterprise in response to a first plurality of user inputs;

defining a plurality of roles and a plurality of personas associated with the enterprise in response to a second plurality of user inputs, wherein each of the personas is distinct from each of the roles, wherein each of the personas is defined to correspond to at least one of: a job function, a business deliverable or a business objective, of personnel of the enterprise;

associating each of the plurality of personas with at least one vertical unit of the plurality of vertical units of the enterprise; and associating each of a plurality of users, who are affiliated with the enterprise, with at least one persona of the plurality of personas, in response to third user inputs.

15. The computer system of claim 11, the operations further comprising:

computing a plurality of performance indicators (KPIs) based on the enterprise data, including computing a particular KPI as a weighted combination of a plurality of sub-KPIs.

16. A non-transitory machine-readable storage medium for use in a processing system, the non-transitory machine-readable storage medium storing instructions, execution of which in the processing system causes the processing system to perform operations comprising:

accessing by a computing system having a processor, enterprise data stored in a storage facility, the enterprise data relating to an enterprise and including timestamped machine-generated data related to the performance or operation of one or more components in an information technology environment;

causing by a computing system having a processor, display of a user interface for receiving user input specifying human-generated data related to the enterprise;

receiving by a computing system having a processor, the user input specifying the human-generated data related to the enterprise;

associating by a computing system having a processor, timestamp with the human-generated data to produce timestamped human-generated data;

storing by a computing system having a processor, the timestamped human-generated data in association with the timestamped machine-generated data as part of the enterprise data, wherein the timestamped human-generated data includes first timestamped human-generated data;

receiving by a computing system having a processor, additional human-generated data from each of a plurality of different external software applications, wherein said receiving includes using a different software-based connector to retrieve timestamped human-generated data from each of the plurality of different external software applications; and storing by a computing system having a processor, the additional timestamped human-generated data in association with the first timestamped human-generated data and the timestamped machine generated data as part of the enterprise data.

17. The non-transitory machine-readable storage medium of claim 16, the operations further comprising:

defining a plurality of vertical units of the enterprise in response to a first plurality of user inputs;

defining a plurality of roles and a plurality of personas associated with the enterprise in response to a second plurality of user inputs, wherein each of the personas is distinct from each of the roles; and associating each of the plurality of personas with at least one vertical unit of the plurality of vertical units of the enterprise.

18. The non-transitory machine-readable storage medium of claim 16, the operations further comprising:

defining a plurality of vertical units of the enterprise in response to a first plurality of user inputs;

defining a plurality of roles and a plurality of personas associated with the enterprise in response to a second plurality of user inputs, wherein each of the personas is distinct from each of the roles, wherein each of the personas is defined to correspond to at least one of: a job function, a business deliverable or a business objective, of personnel of the enterprise; and associating each of the plurality of personas with at least one vertical unit of the plurality of vertical units of the enterprise.

19. The non-transitory machine-readable storage medium of claim 16, the operations further comprising:

defining a plurality of vertical units of the enterprise in response to a first plurality of user inputs;

defining a plurality of roles and a plurality of personas associated with the enterprise in response to a second plurality of user inputs, wherein each of the personas is distinct from each of the roles, wherein each of the personas is defined to correspond to at least one of: a job function, a business deliverable or a business objective, of personnel of the enterprise;

associating each of the plurality of personas with at least one vertical unit of the plurality of vertical units of the enterprise; and associating each of a plurality of users, who are affiliated with the enterprise, with at least one persona of the plurality of personas, in response to third user inputs.

20. The non-transitory machine-readable storage medium of claim 16, the operations further comprising:

computing a plurality of performance indicators (KPIs) based on the enterprise data, including computing a particular KPI as a weighted combination of a plurality of sub-KPIs.

21. The non-transitory machine-readable storage medium of claim 16, the operations further comprising:

computing a plurality of performance indicators (KPIs) based on the enterprise data, including computing a particular KPI as a weighted combination of a plurality of sub-KPIs; and causing display to a user of an indication of the particular KPI, the indication of the particular KPI including an identifier of the particular KPI, a value of the particular KPI, an identifier and corresponding value of each of the sub-KPIs, and a weight applied to each of the sub-KPIs in computing the particular KPI.

* * * * *